United States Patent
Doctor et al.

(10) Patent No.: US 10,423,999 B1
(45) Date of Patent: Sep. 24, 2019

(54) PERFORMING PERSONALIZED CATEGORY-BASED PRODUCT SORTING

(71) Applicant: RichRelevance, Inc., San Francisco, CA (US)

(72) Inventors: Murtaza M. Doctor, Fremont, CA (US); Tyler David Kohn, Burlingame, CA (US); David Lee Selinger, Pleasanton, CA (US); Jason Zien, Monte Sereno, CA (US)

(73) Assignee: RichRelevance, Inc., San Francisco, CA (US)

( * ) Notice: Subject to any disclaimer, the term of this patent is extended or adjusted under 35 U.S.C. 154(b) by 798 days.

(21) Appl. No.: 14/070,201

(22) Filed: Nov. 1, 2013

(51) Int. Cl.
*G06Q 30/00* (2012.01)
*G06Q 30/06* (2012.01)

(52) U.S. Cl.
CPC ..... *G06Q 30/0625* (2013.01); *G06Q 30/0601* (2013.01); *G06Q 30/0621* (2013.01); *G06Q 30/0631* (2013.01)

(58) Field of Classification Search
CPC ............... G06Q 30/0625; G06Q 20/10; G06Q 30/0601; G06Q 30/0621; G06Q 30/0631
USPC ................ 705/26.1, 14.27, 26.62, 26.7, 26.5
See application file for complete search history.

(56) References Cited

U.S. PATENT DOCUMENTS

| | | | |
|---|---|---|---|
| 6,601,075 B1 | 7/2003 | Huang et al. | 707/104.1 |
| 6,963,867 B2 | 11/2005 | Ford et al. | 707/3 |
| 7,188,106 B2 | 3/2007 | Dwork et al. | 707/5 |
| 2002/0010625 A1* | 1/2002 | Smith | G06Q 30/02 705/14.52 |
| 2005/0102282 A1 | 5/2005 | Linden | 707/3 |
| 2005/0289018 A1 | 12/2005 | Sullivan et al. | 705/27 |
| 2007/0219869 A1* | 9/2007 | Haines | B01J 23/6562 705/26.1 |
| 2008/0109285 A1 | 5/2008 | Reuther et al. | 705/7 |
| 2008/0215416 A1 | 9/2008 | Ismalon | 705/10 |
| 2008/0288348 A1 | 11/2008 | Zeng et al. | 705/14 |
| 2008/0306819 A1 | 12/2008 | Berkhin et al. | 705/14 |
| 2009/0006216 A1 | 1/2009 | Blumenthal et al. | 705/26 |

(Continued)

OTHER PUBLICATIONS

"Adsense," retrieved on Oct. 25, 2011, from http://en.wikipedia.org/wiki/AdSense, 6 pages.

(Continued)

*Primary Examiner* — Yogesh C Garg
(74) *Attorney, Agent, or Firm* — VLP Law Group LLP; James A. D. White

(57) ABSTRACT

Techniques are described for determining personalized category-based product information for a user. The described techniques may in some situations be used by or on behalf of an online retailer to determine a sorted order of at least some products within a product category for the online retailer to display to a customer user on a category-specific Web page of the online retailer, such as based on a browse request by the customer for that category or on another identification of the category by the customer. The determination of particular personalized category-based sorted products for such a customer may in some situations be performed based at least in part on prior activities of the customer, including prior interactions by the customer with the online retailer (e.g., actions by the customer to view and/or purchase particular products, product brands, product sub-categories, product sizes, etc.).

39 Claims, 11 Drawing Sheets

(56) References Cited

U.S. PATENT DOCUMENTS

| | | | | |
|---|---|---|---|---|
| 2009/0144070 | A1* | 6/2009 | Psota | G06Q 10/083 705/330 |
| 2010/0191582 | A1* | 7/2010 | Dicker | G06Q 30/02 705/14.51 |
| 2011/0093324 | A1* | 4/2011 | Fordyce, III | G06Q 20/10 705/14.27 |
| 2012/0158516 | A1* | 6/2012 | Wooten, III | G06Q 30/0269 705/14.66 |

OTHER PUBLICATIONS

"AdWords," retrieved on Oct. 25, 2011, from http://en.wikipedia.org/wiki/AdWords, 7 pages.

"Endeca Technologies, Inc.," retrieved on Oct. 25, 2011, from http://en.wikipedia.org/wiki/Endeca, 2 pages.

"Find a $50 Version of Those $500 Shoes with Modista," retrieved on Feb. 27, 2009, from http://mashable.com/2008/12/11/modista/, 12 pages.

"Google Product Search," retrieved on Oct. 25, 2011, from http://en.wikipedia.org/wiki/Google_Shopping, 2 pages.

"Modista: browse for shoes and handbags by visual similarity," retrieved on Feb. 27, 2009, from http://www.modista.com/, 1 page.

"Modista: Jessica Bennett Fame," retrieved on Feb. 27, 2009, from http://www.modista.com/, 1 page.

"Modista: Women's Shoes," retrieved on Feb. 27, 2009, from http://www.modista.com/, 1 page.

"Omniture," retrieved on Oct. 25, 2011, from http://en.wikipedia.org/wiki/Omniture, 3 pages.

"Online Shopping for Shoes and Handbags," retrieved on Feb. 27, 2009, from http://www.ssasychic.com/fashion/modista-a-new-way-to-shop/, 5 pages.

"Superfish—Search by Sight," retrieved on Feb. 27, 2009, from http://www.superfish.com/, 1 page.

"JewelryViewer," retrieved on Feb. 27, 2009, from http://www.jewelryviewer.com/, 1 page.

"Want a Better Way to Search Amazon and eBay? Try PicClick," retrieved on Feb. 27, 2009, from http://mashable.com/2008/11/25/picclick/, 22 pages.

"Oracle Commerce Solution Overview," Jun. 2012, retrieved on Nov. 15, 2013, from http://www.oracle.com/us/products/applications/atg/oracle-commerce-overviewwp-1667913.pdf, 13 pages.

"Oracle Endeca Guided Search" copyright 2012, retrieved on Nov. 15, 2013, from http://www.oracle.com/us/products/applications/web-commerce/oracle-endeca-guided-search-1504990.pdf, 2 pages.

* cited by examiner

Example Activity Information For User UUU With Retailer RRR

| | Interaction Date | Product ID | Category | Sub-Category | Format Type | Author | Publisher | Price | Size | Brand | Viewed | Searched For | Purchased |
|---|---|---|---|---|---|---|---|---|---|---|---|---|---|
| 231 | 01/01/20XX | 2391034 | Books | Romance | Paperback | S. Smith | Random House | $7 | - | - | X | - | X |
| 232 | 01/01/20XX | 4872340 | Books | Mystery | E-book | J. Jones | Penguin | $7 | - | - | X | - | - |
| 233 | 01/02/20XX | 1239780 | Books | Romance | E-book | B. Brown | Random House | $5 | - | - | X | X | X |
| 234 | 01/03/20XX | 3187107 | Books | Romance | E-book | D. Davis | Random House | $6 | - | - | - | X | X |
| 235 | 01/05/20XX | 1285478 | Books | Romance | E-book | L. Lee | Harper Collins | $5 | - | - | X | - | - |
| 236 | 01/07/20XX | 8634228 | Dresses | Casual | - | - | - | $220 | 6 | Guess | X | - | X |
| 237 | 01/07/20XX | 8395842 | Dresses | Evening | - | - | - | $350 | 6 | Monsoon | X | - | X |
| 238 | 02/01/20XX | 3849897 | Books | Mystery | Hardback | K. King | Penguin | $9 | - | - | X | - | - |

Fig. 2C

Example Factor Weighting Information For User UUU

220

| Factor Type | Viewed Influence (0-1) | Purchased Influence (0-1) | ... |
|---|---|---|---|
| 221 Sub-Category | 0.4 | 0.2 | |
| 222 Format Type | 0 | 0.5 | |
| 223 Product | 0.5 | 0 | |
| 224 Product Newness | 0.2 | 0.2 | |
| ⋮ | | | |

225

| Selection Control | Influence (0-1) | ... |
|---|---|---|
| 226 Sub-Category Diversity | 0.25 | |
| 227 Personalization | 0.9 | |
| ⋮ | | |

| Category | Determined Affinity | Weight (0-1) | |
|---|---|---|---|
| 261 Books | Sub-Category:Romance | 0.6 | ... |
| 262 Books | Sub-Category:Mystery | 0.2 | |
| 263 Books | Format Type:E-book | 0.6 | |
| 264 Books | Publisher:Random House | 0.1 | |
| 265 Books | Price:Bargain | 0.3 | |
| ⋮ | | | |
| 266 Dresses | Size:6 | 0.8 | |
| 267 Dresses | Brand:Guess | 0.4 | |
| ⋮ | | | |

271

| Category | Selection Strategy | Weight (0-1) | |
|---|---|---|---|
| 272 <all> | Most Selected Over Last 30 Days | 0.1 | ... |
| 273 <all> | Most Viewed Over Last 30 Days | 0.1 | |
| 274 <all> | Highest Click-Through Rate Over Last 30 Days | 0.1 | |
| 275 <all> | Release Date | 0.1 | |
| 276 <all> | Units Sold Over Last 30 Days | 0.3 | |
| 277 <all> | Dollars Sold Over Last 30 Days | 0.3 | |
| ⋮ | | | |

Example Activity Information For User UUU With Other Online Sites

| | 292 | 293 | 294 | 295 | 296 | | 297 | 298 | 299 |
|---|---|---|---|---|---|---|---|---|---|
| Interaction Date | Product ID | Category | Sub-Category | Price | Brand | | Liked | Shared | Mentioned |
| 01/01/20XX | 2391034 | Books | Romance | $7 | - | | X | - | - |
| 01/01/20XX | 4872340 | Books | Mystery | $7 | - | | X | - | - |
| 01/02/20XX | 1239780 | Books | Romance | $5 | - | | - | X | X |
| 01/02/20XX | 3187107 | Books | Romance | $6 | - | | X | - | - |
| 01/05/20XX | 1389478 | Books | Romance | $5 | - | | X | - | - |
| 01/07/20XX | 8634228 | Dresses | Casual | $220 | Guess | | - | - | - |
| 01/07/20XX | 8395942 | Dresses | Evening | $350 | Monsoon | | X | - | X |
| ... | | | | | | | | | |
| 02/02/20XX | 3840897 | Books | Romance | $9 | - | | - | - | - |

*Fig. 2E*

PERFORMING PERSONALIZED CATEGORY-BASED PRODUCT SORTING

TECHNICAL FIELD

The following disclosure relates generally to determining category-based product-related information for a user, such as by determining products in an indicated product category that are sorted in a manner that is personalized to the user.

BACKGROUND

In addition to providing access to information, the World Wide Web (also referred to as the "Web") has increasingly become a medium that is used to search for, shop for and order items (such as products, services and/or information) that are available for purchase, rent, lease, license, trade, evaluation, sampling, subscription to, etc. In many circumstances, a user may visit the Web site of a Web merchant or other online retailer that provides one or more items (sometimes referred to as a "Web store"), such as to view information about the items, give an instruction to place an order for one or more items, and provide information needed to complete the purchase (e.g., payment and shipping information). After receiving an order for one or more items, the online retailer then fulfills the order by providing the ordered items to the indicated recipient, such as by delivering product items electronically (e.g., music downloaded over the Internet) and/or through physical distribution channels (e.g., shipment via a governmental postal service or private common carrier, such as for paperback books). Similarly, some service items may be provided electronically (e.g., providing email service), while others may be provided physically (e.g., performing cleaning services at the purchaser's house).

While access to information about items via the Web provides many benefits, various problems also exist. As one example, given the large numbers of items that may be available from various online retailers, it can be difficult for a consumer user to identify particular items that may be of interest. In addition, it can be difficult for item providers to provide information about particular products to consumer users in appropriate situations.

BRIEF DESCRIPTION OF THE DRAWINGS

FIGS. 2A-2E illustrate examples of determining a sorted order of products in an indicated category in a manner that is personalized to a user.

DETAILED DESCRIPTION

Figure 1:
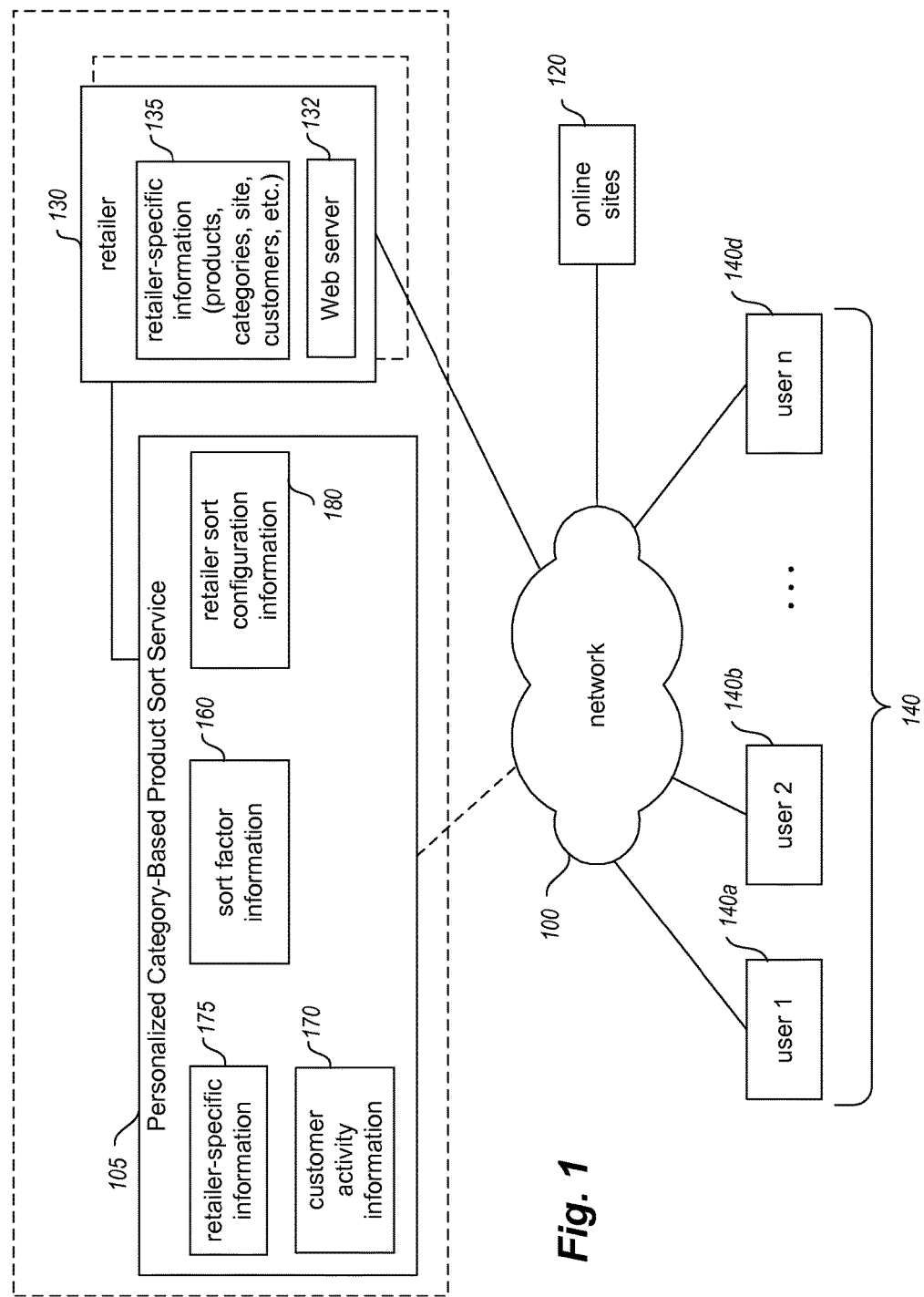
FIG. 1 is a network diagram illustrating an embodiment of a personalized category-based product sort service for determining a sorted order of products in an indicated category in a manner that is personalized to a user.

Techniques are described for determining personalized category-based product information for a user in various manners, such as in at least some embodiments by determining a sorted order of products in an indicated category in a manner that is personalized to a user. In some embodiments, the described techniques are used by or on behalf of an online retailer to determine a sorted order of at least some products within a product category for the online retailer to display to a customer user on a category-specific Web page of the online retailer, such as based on a browse request by the customer for that category or on another identification of the category by the customer. In addition, in at least some embodiments, the determination of particular personalized category-based sorted products for such a customer may be performed based at least in part on prior activities of the customer, including prior interactions by the customer with a retailer (e.g., actions by the customer to view and/or purchase particular products, product brands, product sub-categories, product sizes, product colors, etc.) and/or with one or more other entities (e.g., social media sites). At least some of the described techniques are automatically performed in at least some embodiments by an automated computer-implemented Personalized Category-Based Product Sort ("PCBPS") system that provides a corresponding PCBPS service, such as in conjunction with one or more affiliated online retailers or other online sites.

As noted above, the determination of particular personalized category-based sorted products for a user may be performed based at least in part on prior activities of the user in at least some embodiments. In particular, prior activities of the user may be tracked and analyzed in order to determine affinities of the user with respect to one or more particular products within a product category and/or to determine affinities of the user with respect to particular product attributes for one or more product categories. After one or more such product-related affinities of the user are determined, they may further be used as identified factors for ranking and sorting some or all products in a particular category in a personalized manner for the user, such as in an attempt to provide the products of most interest to the user at the beginning of a sorted group of category-based products, and with subsequent products in the sorted group being of a lower relevance rank than the preceding products in the sorted group. The product-related affinities may be used to perform the ranking and sorting in various manners in various embodiments, including by using different weights corresponding to different affinities, and combining multiple factors corresponding to multiple such affinities in a weighted manner. In some embodiments, the determined product-related affinities for a user may further be combined with one or more selection strategies that are not personalized to the user, such as to combine one or more personalized weighted identified factors with one or more weighted selection strategies. Additional details are included below related to using identified product-related affinities for a user to performing ranking and sorting in a manner personalized to the user, as well as to also using non-personalized selection strategies.

The display or other presentation of the personalized category-based sorted products for a user may occur in various manners, including in some embodiments via Web sites or other electronic sites (e.g., as part of Web pages or other content served from those sites) of one or more online retailers or other online entities that are distinct from the PCBPS service and its provider. In some embodiments, such Web sites or other electronic sites may be associated with companies that are fee-based clients of the PCBPS service, such as for an online retailer that provides information to users about products in one or more product categories, or for other electronic sites that may provide other types of category-based information to users. In at least some of the following portions of the description, reference will be made to 'products' and 'product categories', but it will be understood that the described techniques may be used with other types of categorizable items and information as well, including items that are services provided to users.

FIG. 1 is a network diagram illustrating an embodiment of a personalized category-based product sort service that is configured to determine a sorted order of products in an indicated category in a manner that is personalized to a user.

The illustrated example of FIG. 1 includes a number of example users 140 that are each interacting with one or more Web sites or other target sites 130 over one or more intervening networks 100, such as to obtain Web pages or other electronic information pages (e.g., HTML-based emails, or other groups of information that are formatted at least in part based on HTML, or HyperText Markup Language, or based on other related formats or markups) from those target sites 130 and to optionally engage in commerce activities with those target sites 130. In particular, in this example, some or all of the example target sites 130 may be provided by one or more online retailer businesses that sell or otherwise make products or other items available to customers or potential customers, such as via a Web site (e.g., a Web store) or other network-based service hosted on one or more server computing systems, with Web server software 132 providing Web pages of the Web site. For example, the users 140 may access a Web site 130 of a retailer to obtain one or more Web pages, such as to view information about, search for, browse for, rate, place an order for, and/or provide information for completing a purchase of or a return of one or more products or other items available from the retailer, such as based on product item information that is part of retailer-specific information 135 stored by the site 130.

In addition, in at least some such embodiments, information about various of the interactions of the users 140 with one or more retailer Web sites 130 may be collected and included as part of customer activity information 170 by the service 105, such as interactions of the users (e.g., product views, purchases, returns, ratings, searches, etc.) that are related to the products or other items made available on the retailer Web sites 130. Such customer activity information may be obtained by the service 105 in various manners, such as by being supplied by a retailer site to the service 105, and/or by being generated by the service 105 based on tracking at least some activities of the users while they are interacting with a retailer site (e.g., by tracking activities of the users in selecting particular elements of Web pages and/or in otherwise requesting particular types of information; etc.). In addition, such customer activity information may in some embodiments include information regarding interactions of customers that occur other than with online retailer sites, such as customer interactions at physical brick-and-mortar stores of the retailers, customer interactions with mobile applications executing on client devices of the users to obtain product-related information and functionality from the online retailer sites or other online sites, customer interactions with other online sites 120 (e.g., social media sites), etc.—the service 105 may obtain such other types of customer activity information by requesting it or retrieving it from the sites or other sources that have the information, or by having it be otherwise sent to the service 105 from those sites or other sources.

As discussed in greater detail elsewhere, the customer activity information 170 may be analyzed by the service 105 to assist in performing determinations of personalized sorted orders of products in indicated categories for particular users. In particular, the customer activity information may be analyzed in order to determine affinities of particular users with respect to particular products and/or with respect to particular product attributes, such as for particular product categories. After such product-related affinities of a user are determined, they may further be used as identified factors for ranking and sorting some or all products in a particular category in a personalized manner for the user, such as by using different weights corresponding to different affinities, and combining multiple factors corresponding to multiple such affinities in a weighted manner. Information about determined affinities and associated weights may be stored by the service 105 as part of sort factor information 160.

As discussed in greater detail elsewhere, the information provided to client computing devices (not shown) of the users 140 may include products in an indicated product category from a retailer target site 130 that are sorted in a manner that is personalized to the user by the service 105, such as by using the sort factor information 160, and with FIGS. 2B-2E providing examples of personalized category-based sorted products and related information. In other embodiments, some or all of the users 140 may obtain displayed or otherwise presented information from target sites 130 in manners other than via personal computing devices of the users, such as if those users are at a physical retail location and interact with one or more publicly accessible device(s) at the physical retail location (e.g., a fixed-location kiosk provided by the retailer, a mobile wireless device belonging to the retailer, etc.) in order to view and/or interact with product information and related content from the retailer, including products in an indicated product category that are sorted in a manner that is personalized to a user. In some embodiments, the customer activity information 170, and more generally the information about users that is used by the PCBPS service, is limited to information about the interactions of the users with the PCBPS service, interactions with or other state of one or more client devices of the user, and/or interactions with the retailer sites 130 (or other sites with affiliated relationships with the PCBPS service), and does not include information about other actions of users on the Internet or otherwise. In other embodiments, the customer activity information 170 may further include information about other types of activities of users, including interactions with other online sites 120 (e.g., social media sites) and/or interactions with physical brick-and-mortar stores of the retailers, as discussed in greater detail elsewhere herein.

As part of providing Web pages to users, the target sites 130 in this example have previously established an affiliation (whether directly or indirectly) with an example embodiment of the personalized category-based product sort service 105, so that the service 105 may assist in determining products in an indicated product category that are sorted in a manner that is personalized to the users, for display on at least some of the Web pages or other information pages provided by the target sites 130 to the users (e.g., for display on category-specific Web pages of the target sites). The interactions between a target site, a user, a client device of a user and the PCBPS service 105 may occur in various manners in various embodiments, such as for a target site to request personalized category-based sorted products for presentation to one or more users, for a user's computing device to request personalized category-based sorted products for presentation to the user (e.g., for display to the user as part of a category-specific Web page), etc. In addition, the service 105 may have other forms in some embodiments, such as to be integrated with or otherwise included as part of a particular target site 130 (e.g., to provide the described personalized category-based product sorting techniques for that target site on behalf of its users). In addition, in some situations and embodiments, some or all of the users 140 may optionally interact directly with the PCBPS service 105, such as to request and receive particular personalized category-based product sorting information from the PCBPS service 105 (e.g., based on a request initiated by the user; based on a request initiated by a Web page provided to the user from a target site 130, such that display or other presentation of the Web page on a computing device, not shown, of the user causes the request; etc.).

In this example, the network 100 is a publicly accessible network of linked networks, possibly operated by various distinct parties, such as the Internet, although in other embodiments the network 100 may have other forms. For example, the network 100 may instead be a private network, such as, for example, a corporate or university network that is wholly or partially inaccessible to non-privileged users. In still other embodiments, the network 100 may include both private and public networks, with one or more of the private networks having access to and/or being accessible from one or more of the public networks. Furthermore, the network 100 may include various types of wired networks and/or wireless networks (e.g., Wi-Fi, cellular, etc.) in various situations. In this illustrated example of FIG. 1, the users 140 may each use client computing systems and/or devices (not shown) to interact with the target sites 130 and optionally the service 105 to obtain various described functionality via the network 100, and in doing so may provide various types of information to the service 105 (whether directly, or via interactions with target sites 130 and/or other online sites 120).

In addition, administrative users, not shown, may interact directly with the service 105 on behalf of clients of the service 105, such as to specify instructions or otherwise configure functionality that the service 105 provides for a particular target site 130 client related to determining products in indicated product categories that are sorted in a manner that is personalized to users of the target site. Such interactions of administrative users with the service 105 may occur in various ways in various embodiments, such as, for example, in an interactive manner via a GUI that is provided by the PCBPS service 105 and displayed on computing systems and/or other devices of those users 140, or in a programmatic manner via an API ("application programming interface") provided by the PCBPS service 105 that allows computing systems and/or executing programs to invoke such functionality programmatically, such as using Web services or other network communication protocols. If such optional configuration information is supplied for one or more particular retailer clients or other clients of the service 105, corresponding information 180 may be stored and subsequently used by the service 105 in determining personalized category-based sorted products for users of those clients.

As noted above, the service 105 has access in this example to information about products of one or more product categories that are available for display via the target sites 130, such as may be included as part of the retailer-specific information 135 of those target sites and/or as part of retailer-specific information 175 stored by the service 105. Such information 175 may include some or all of the same information for a target site 130 as the target site uses about the category-based products that will be sorted and then indicated by the service 105 for that target site (e.g., as previously received from target site clients), or alternatively some or all such product-related information may instead be stored elsewhere (e.g., by the target sites 130; on the computing devices of the users 140; on other network-accessible computing or storage systems of the clients or others, not shown; etc.) and accessed by the service 105 as needed. In addition, in this example, the service 105 includes additional information to enable the described personalized category-based product sorting techniques to be performed, including the following: optional information 180 that, if specified, indicates retailer client-specific configuration for how to determine personalized category-based sorted products; information 160 that includes information about particular identified factors used in determining personalized category-based sorted products (e.g., determined product-related affinity information for particular users, whether in a client-specific manner or by aggregating determined product-related affinity information for a particular user from multiple clients; weighting information to use with particular such identified factors, such as may be configured by a client, may be default weights used by the service 105 for multiple clients, may be automatically learned weights for one or more clients and/or users; etc.); customer activity information 170 (e.g., for use in personalizing the sort order of particular products and product categories for particular users); and other information 175 related to products (e.g., information about product categories, product attributes and other metadata information for products); etc.

For illustrative purposes, some embodiments are described below in which specific types of personalized category-based sorted product recommendations are generated and used in specific manners to provide users with specific types of information for specific types of products in specific types of situations. These examples are provided for illustrative purposes and are simplified for the sake of brevity, and the inventive techniques may be used in a wide variety of other situations, some of which are discussed below, with the techniques not being limited to use with particular types of products or more generally with particular types of items, to particular types of user interfaces or other mechanisms for interacting with users or otherwise using determined personalized category-based sorted products, etc. For example, in some embodiments, the described techniques may be used to select entities (e.g., people, businesses or other organizations, etc.) or other things distinct from products, may be used to personalize items to be provided to entities other than users (e.g., organizations or other groups), etc.

Figure 2A:
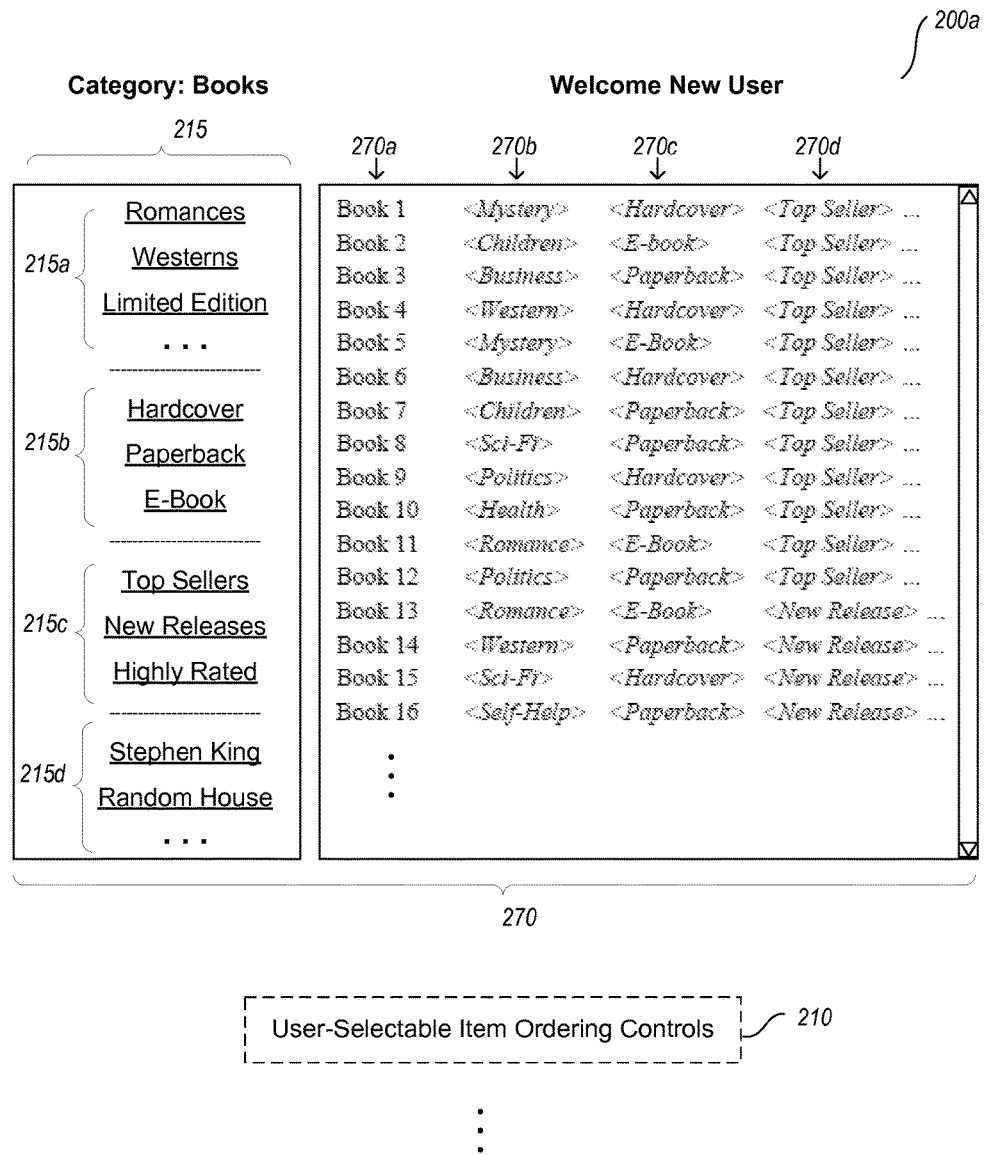

FIGS. 2A-2E illustrate examples of determining a sorted order of products in an indicated category in a manner that is personalized to a user. In particular, FIG. 2A illustrates an example of a Web page 200a that is provided by an example online retailer client of the PCBPS service (referred to as "Retailer RRR" in the example of FIG. 2A), such as for display to a particular user (not shown). In this example, the Web page 200a is a category-specific Web page related to a Books product category, and the user is a new user who has not yet been identified (e.g., for an existing customer that has not logged in or otherwise identified themselves, or for a new customer that has not previously interacted with Retailer RRR). The Web page 200a may, for example, be displayed to the user in response to a prior browse request by the user for the Books category, or another indication by the user of a request to display category-specific information for the Books category.

In the example of FIG. 2A, various information 270 is displayed to the new user related to the Books category, including a list of some or all books that are available from Retailer RRR, as well as various user-selectable controls 215 via which the user can choose to filter the books being displayed for the category, so that only a subset of the books that correspond to a selected control are displayed. In this example, each of the books in the list has a name or other identifier 270a, and also has various attributes and associated metadata that may or may not be displayed to the user in Web page 200a, such as an indication of the book's primary sub-category 270b, format type 270, grouping type 270d, etc. The Web page 200a may also optionally include other types of information, including various optional user-selectable item ordering controls 210 via which the user may indicate to initiate a purchase or other order for one or more books or other items.

In this example, because the user has not been identified, and thus the PCBPS service lacks information about particular determined affinities of the user, the initial list of books that are displayed to the new user is a default list that is not personalized to the user. In particular, in this example, the default list includes at least sixteen books, with the first twelve books that are listed being selected based on being current top sellers, and the next four books that are listed being selected from books that are new release. In the illustrated embodiment, the user may further use scrolling or other pagination controls to continue to see all books in the Books category, if so desired. It will be appreciated that a default list of books may be selected in other manners in other embodiments and situations, including in a random manner, or by using book-related attributes other than being top sellers or new releases.

In the illustrated embodiment, the example user-selectable controls 215 include various controls 215a corresponding to different types of sub-categories within the Books category (e.g., corresponding to genres of books in this example), such as romances, westerns, limited edition books, etc. Thus, if the user-selectable control corresponding to "Romances," for example, was selected, the corresponding list of books would be updated to only show books in that sub-category (i.e., example Books 1-10, 12 and 14-16 would no longer be available to be displayed while the Romance sub-category filter was applied, and other books in the Romance sub-category would instead be displayed). The example user-selectable controls 215 further include controls about available book format types 215b, which in this example embodiment includes hardcover books, paperback books, E-books (or electronic books), etc. Furthermore, the example user-selectable controls 215 in this illustrated embodiment include various controls corresponding to groupings 215c based on attributes of the books or other associated metadata, which in this example includes groupings for top sellers (e.g., books that have had the highest amount of sales over a defined prior period of time, whether by monetary value and/or number of units sold, and whether based on sales by the Retailer RRR and/or based on other sales measures that are not specific to Retailer RRR), for new releases (e.g., for books that have been first made available for sale within a prior defined period of time), for highly rated books (e.g., based on customer reviews or other rating mechanisms, whether based on ratings specific to Retailer RRR or based on using ratings generated by one or more groups external to the retailer), etc. Moreover, the example user-selectable controls 215 in this illustrated example include additional controls 215d that may correspond to other book-related attributes or associated metadata, such as for a particular author, a particular publishing house, a particular price range, etc. It will be appreciated that other product types or other non-product items may have other types of user-selectable controls, including related to particular brands, particular manufacturers, particular designers or other creators of the products or other items, etc.

Thus, with respect to the example of FIG. 2A, the unidentified new user may receive some useful information related to products within an indicated category, such as in the current example based on books that are top sellers or new releases, but the initial information that is displayed to the user is not sorted or otherwise selected in a manner that is personalized to the user.

Figure 2B:
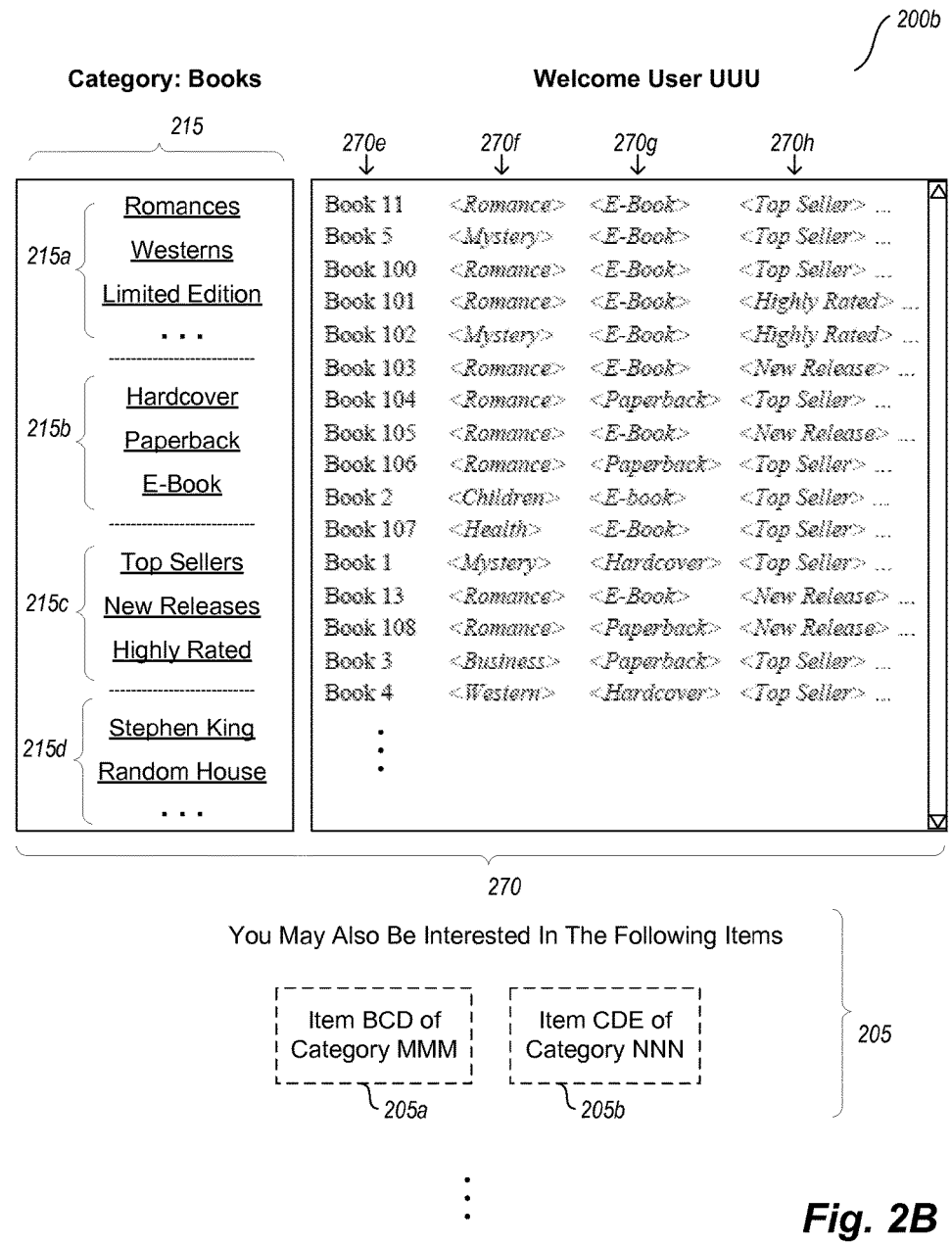

FIG. 2B illustrates an example similar to that of FIG. 2A, but with the example Web page 200b of FIG. 2B including category-based sorted product information that is personalized to a particular user (referred to in this example as "User UUU"). For example, the particular user may have previously logged in or otherwise identified themselves to Retailer RRR, such as on a prior Web page (not shown) of the retailer. In the example of FIG. 2B, information 270 continues to be displayed on Web page 200b to the user related to at least some of the available books in the Books category, along with various user-selectable controls 215 similar to those of FIG. 2A. In addition, various optional additional recommendation information 205 may be presented to the user in the example of FIG. 2B, such as for other items 205a and 205b of other categories, such as based on user-specific information available to the retailer or to the PCBPS service that is used to generate such recommendations (e.g., based at least in part on preference information specified by the user). While not illustrated in FIG. 2B, various other information may similarly be displayed, including optional user-selectable item ordering controls 210 such as those of FIG. 2A.

In the example of FIG. 2B, the PCBPS service has used information specific to the user to provide a personalized sorted group of books for the user. In this manner, the first listed book (referred to as "Book 11") has a highest determined relevance ranking for this particular user based on information determined from analysis of prior activities of this user, with each successive book in the list having progressively lower determined relevance rankings based on such information. For example, and as discussed in greater detail with respect to the examples of FIGS. 2C-2E, this particular user may have a determined affinity for books in Romance and Mystery sub-categories, may have a determined affinity for books in the E-book format type, and may further optionally have one or more other determined affinities for other particular books or book-related attributes. Based on such determined affinities, books in those sub-categories and that format type may be scored higher than other similar books in other sub-categories and format types. Accordingly, in some embodiments, all of the books that are initially displayed to this particular user may be in the Romance and Mystery sub-categories and of the E-book format type.

However, the PCBPS service is configured in this example to provide some diversity in the personalized sorted group of books that are provided for users. Such diversity may be configured in various manners, including with respect to one or more book-related attributes. For example, if some amount of diversity is configured to be used for the sub-category product attribute, at least some books in the initial displayed list of sixteen books may be selected from other sub-categories for which the current user does not have a determined affinity, even if additional book are available to be displayed from the sub-categories for which the user does have determined affinities. Thus, in this example, the first nine books shown in the displayed list are of the Romance or Mystery sub-categories, with 75% overall of the initial displayed list being in those sub-categories. However, the other 25% of the books that are initially displayed in this example are from other sub-categories, to reflect the configured diversity for the sub-category attribute. In addition, in this example, some amount of diversity is configured to be used for the format type product attribute, so that at least some books in the initial displayed list of sixteen books are selected from other format types for which the user does not have a determined affinity, despite additional books being available to be displayed that are of the E-book format type. Thus, the first six books shown in the displayed list in this example are all of the E-book format type, and 62.5% overall of the displayed books are of that format type, but the other initially displayed books are of the hardcover or paperback format types. In addition, the configuration information used by the PCBPC service may further cause a subset of the initially displayed books to be selected using the personalized determined affinities for this user, while also including one or more other books that are selected in another manner (e.g., to display a certain percentage of new release books and/or top seller books). Such configuration information used by the PCBPS service may be default information used by the service for multiple retailer clients, or instead may in some embodiments and situations be specified by the Retailer RRR client for use with its users (e.g., as specified by an administrative user representing the retailer). Additional details related to configured diversity and other types of configuration information are discussed elsewhere herein, including with respect to FIG. 2D.

Thus, in this manner, the initial displayed list of products in this example is personalized to the particular user, and a majority of the displayed products include attributes corresponding to determined affinities of the user, while the displayed list further includes some diversity and non-personalized items in this example to allow the user to select additional types of books as desired. It will be appreciated that a determined personalized category-based product sorting such as that displayed in FIG. 2B may be displayed in other manners in other embodiments. For example, a subset of the available books is initially displayed to the user in the illustrated embodiment, and the user is allowed to use scrolling or other pagination-related controls (not shown) to see all of the other books available in the category. In other embodiments, other types of displays may be used, such as to display all of the items within a particular category on a single page (e.g., to enable user review of all the items without changing the page or otherwise updating its display), while in other embodiments only a subset of the total items within a category may be selected and made available to the user (e.g., based on the personalization determinations of the PCBPS service). In addition, while the displayed information in FIG. 2B includes indications of a book name or other identifier 270e for the initial list of books, such books may have other attributes (e.g., a sub-category type 270f, a format type 270g, and grouping information 270h, in a manner similar to corresponding information of FIG. 2A), whether displayed or not, and other such attribute-information may similarly be used by the PCBPS service in determining personalized category-based product sorting for the user. Thus, in at least some embodiments, a variety of other types of attribute-related information for books may be tracked and used by the retailer and the PCBPS service, whether such information is initially displayed to the user as part of Web page 200b or not.

FIG. 2C continues the example of FIG. 2B, and illustrates various information 230 that the PCBPS service may track and analyze regarding prior activities of the example user of FIG. 2B. In this example, the information 230 corresponds to interactions of that user with this particular retailer client, such as via one or more sales channels of the retailer client (e.g., an online store via a Web site of the retailer, a brick-and-mortar physical store of the retailer, a retailer-specific mobile application that the user executes on a client device of the user, etc.), although in other embodiments other types of activity-related information for the user may be used, whether in addition to or instead of such retailer-specific activity information, as discussed further with respect to FIG. 2E.

In this example, the information 230 is shown in a table format, with each row 231-239 illustrating one more activities of the user related to a particular product, and with the columns or fields 241-259 illustrating various information about the product and the corresponding user activity. For example, with respect to row 231, information fields 242-250 indicate information about a particular product that was the subject of the user activity, which in this example includes a product ID 242, a category 243 of the product ("Books" in this example), a sub-category 244 of the product ("Romance" in this example), a format type 245 ("Paperback" in this example), an author 246 of the book, a publisher 247 of the book, a price 248 at which the product is offered, and optionally other attributes 249-250 (e.g., product size, product brand, etc.). In addition, the information for row 231 further includes a date 241 of the interaction related to the user's activities, which in some embodiments may optionally include additional related information (e.g., one or more particular times, one or more particular sales channels, etc.). The displayed information in fields 257-259 includes information in this example about one or more types of activities that the user participated in related to this product, which in this example includes that the user viewed 257 the product, and purchased 259 the product, but did not perform search 258 activities for this product. It will be appreciated that a variety of other types of information may be tracked and analyzed with respect to user activities in other embodiments, and that at least some of the displayed types of information may not be used in some embodiments. The other rows 232-239 illustrate other types of activities of this user with respect to other products, including other book products, as well as other products of other category types—while only a limited number of user activities are reflected in this example, it will be appreciated that activity information for at least some users may reflect hundreds, or thousands or more activities of the user with respect to particular products.

FIG. 2D continues the examples of FIGS. 2B and 2C, and illustrates information 260 that may reflect determined affinities of the example user of FIG. 2B based on analysis of the user activity information 230 of FIG. 2C. FIG. 2D further illustrates other types of configuration information 220, 225 and 271 that may be used by the PCBPS service as part of its automated operations in determining personalized category-based sorted products for this user and for other users. While some or all of the other information 220, 225 and 271 of FIG. 2D may in some embodiments and situations be default information that is used by the PCBPS service for multiple clients and multiple users, in other embodiments and situations some or all of the information 220, 225 and 271 may instead be specific to the retailer (e.g., configured by the retailer, or automatically determined by the PCBPS service based on activities of users of the retailer) and/or may be personalized to the particular user (e.g., based on automated determinations of the PCBPS service related to the user, based on user-specific configurations performed by the retailer client for the example user, etc.).

In particular, the example information 260 corresponding to the example user reflects various affinities of the user that are determined by the PCBPS service with respect to particular products and/or product attributes—while the determined affinities illustrated in information 260 are specific to particular categories, it will be appreciated that at least some types of product attribute affinities may instead be determined in a manner that is not specific to particular categories (e.g., price-related affinities, brand-related affinities, etc.). In this example, the PCBPS service has determined affinities of the user with respect to two sub-categories in the Books category, with those being the Romance and Mystery sub-categories, as reflected in rows 261 and 262. In addition, the PCBPS service has further determined weighting information corresponding to each of those determined affinities, for use when combining multiple factors as part of the personalized sort of products within the Books category for the example user—in this example, the determined weighting indicates that the example user's affinity for Romance sub-category books is higher than the example user's affinity for Mystery sub-category books. The weights that are illustrated are selected in this example between the range of 0 and 1, with a higher weight reflecting a higher positive preference of the user than a lower weight, although it will be appreciated that weights may be expressed and used in other manners in other embodiments. The determined affinity information for the example user further indicates that the user has an affinity for E-book format type books, for books from the Random House publisher, for bargain-priced books, etc., as shown in rows 263-265, with corresponding weights shown for those determined affinities. The information 260 further includes determined affinities for the user in one or more other categories, which in this example include affinities with respect to the Dresses category that include an affinity for a particular size dress and a particular brand, with corresponding weighting being shown.

Thus, as a simple example using just the information 260 and with respect to the first-listed book of FIG. 2B (that being Book 11, of sub-category Romance, format type E-book, grouping Top Seller, etc.), the information 260 could be used to determine that the book would receive a relevance score for the example user of at least 1.2 (with 0.6 points being based on the Romance sub-category affinity and 0.6 points being based on the E-book format type affinity), with possible additional points being added if Book 11 has a publisher of Random House and/or a price that is a bargain price (corresponding to entries 264 and 265 of the information 260). Conversely, using just the information 260 and with respect to the tenth-listed book of FIG. 2B (that being Book 2, of the Children sub-category, the E-book format type, and the Top Seller grouping), that book may receive a relevance score for the example user of at least 0.6 (based on the book being of the E-book format type, corresponding to the determined affinity shown in entry 263), and possibly receive additional points for other attributes of the book for which the example user is determined to have a corresponding affinity. In this manner, each of the products in the Books category may be scored based at least in part on the determined affinities of the user, with those relevance scores for the example user being used to rank the products and to generate the sorted personalized list illustrated in FIG. 2B. Furthermore, if the sorted personalized list for the example user is generated based only on the determined affinity information 260, then the sorting may in this example (and based on the example weights) first include all books of the Romance sub-category from the Random House publisher that are in the E-book format type and have a Bargain price, followed by all books of the Mystery sub-category from the Random House publisher that are in the E-book format type and have a Bargain price, etc.

Such personalized relevance scores and rankings for the example user based on the determined affinity information 260 may further be altered in at least some embodiments based at least in part on other types of information illustrated in FIG. 2D, including information 225 and 271. For example, information 225 includes various entries 226-227 that show different types of selection controls that may in this example be configured to reflect how much (if any) diversity is provided in sub-categories of the personalized list shown in FIG. 2B, and how many of the sorted results are based on the user-specific determined affinities versus use of other selection strategies that are not personalized to the user. It will be appreciated that a variety of other types of selection controls may be provided and used, including with respect to diversity for product-related attributes other than sub-categories, for diversity that is not limited to specific product-related attributes, etc. Thus, to expand the previous example with respect to Book 11 and Book 2 that was based only on using the determined affinity information 260, and to include the use of the selection control information 225, such diversity and personalization controls may be used to modify the personalized sorted book list that would be generated based only on the determined affinity information 260. For example, based on the sub-category diversity influence value of 0.25 in row 226, 25% of the initially displayed sorted list may be chosen from sub-categories other than the Romance and Mystery sub-categories for which the example user has determined affinities—thus, in the example of FIG. 2B, 75% of the initially displayed sorted list are from the Romance and Mystery sub-categories for which the example user has determined affinities, and 25% of the initially displayed sorted list are from other sub-categories. Such diversity-related scoring may, for example, be based on adding increasing penalties for particular books that are being ranked if higher-ranked books share a product-related attribute for which diversity is being provided—thus, with respect to the example of FIG. 2B, the third-ranked book (Book 100) may have received at least a small penalty in its relevance score based on there already being 1 higher-ranked book in the same Romance sub-category, and the fourth-ranked book (Book 101) may have also received a penalty of at least the same size in its relevance score based on there already being 2 higher-ranked books in the same Romance sub-category. Additional details are included below related to managing diversity.

In addition, if at least some of the results in a determined personalized list for a particular user are based at least in part on information that is not personalized to the user, information such as that of information 271 may be used to indicate one or more non-personalized selection strategies that may be used for such other purposes. In this example, entries 272-277 reflect different types of selection strategies that may be applied to one or more indicated categories (with these example selection strategies being specified for use with all categories), with the different selection strategies having different associated weightings. Thus, for example, based on the personalization value of 0.9 in row 227 of information 225, 90% of the personalized list of products in FIG. 2B may in some embodiments be selected for the example user based on the personalized information 260, and 10% may be selected based on using a combination of the selection strategies shown in information 271. Alternatively, in some embodiments and situations, all of the products shown in the initially displayed list of FIG. 2B may be based on a combination of the information 260 and 271, with information 260 having an influence of nine times that of the information 271 (based on the personalization value of 0.9) in generating the relevant score for each of the possible products. It will be appreciated that personalized and non-personalized ranking information may be combined in other manners in other embodiments, and additional related details are included below.

Thus, to continue the previously discussed example with respect to the first-listed and tenth-listed products shown in the displayed list of FIG. 2B, the information 271 may be used to modify the personalized sorted book list that would otherwise be generated based only on the determined affinity information 260. For example, with respect to the first-listed book of FIG. 2B (Book 11), in addition to the 1.2 weighted relevance points that it may receive for User UUU based on the personalized determined affinities for books in the Romance sub-category and for E-book format type books (as reflected in rows 261 and 263 of information 260), the book may further receive additional relevance points that cause it to be the highest ranked book for User UUU based on one or more of the selection strategies indicated in rows 272-277 of information 271. Thus, if Book 11 is among the most selected and most viewed books over the last 30 days, the book may further receive additional relevance points based on that status, as weighted in accordance with the weighting information in rows 272 and 273 of information 271. One or more of the other selection strategies indicated in rows 274-277 of information 271 may similarly provide additional relevance points for Book 11, such that Book 11 has an overall total relevance score higher than any other books, and accordingly would be first in the personalized sorting for User UUU. Conversely, when considering the relevance of Book 11 for another user, it would still potentially receive relevance points based on such non-personalized selection strategies of rows 272-277, but may receive less or no personalized relevance points if the other user does not have determined affinities for Book 11 or its attributes (e.g., for the Romance sub-category or for E-book format type books), or if the weights for any such affinities for the other user are lower. Thus, in some embodiments, the determined personalized category-based product sorting may be based on a combination of personalized determined affinities and non-personalized selection strategies.

The illustrated information 220 of FIG. 2D may further be used by the PCBPS service when generating the determined affinity information 260 for the example user based on the user activity information 230 of FIG. 2C. For example, for each of the activities 257-259 of FIG. 2B, the information 220 may allow different amounts of influence to be associated with different activity types, when identifying determined affinities and associated weights. For example, with respect to row 221, and for to the sub-category attribute of a product that a user interacts with, activities of the user to view the item may be rated as being twice as influential as activities of the user to purchase the item, such that a high number of views by a user of products in a particular sub-category may reflect a high weighting for a determined affinity of that user for that sub-category, while purchases of products in that sub-category without associated viewing would reflect a lower weighting for a determined affinity of that user for that sub-category. It will be appreciated that such influence information may be expressed and used in other manners in other embodiments, including to not be used in some embodiments (such that all activities are treated equally with respect to determining user affinities). In addition, as illustrated in information 220, some types of activities may be given no weight or influence, such as a purchase of a product not being given any weight in determining that the user has an affinity for that product in this example (e.g., so that a user purchase of a product will not result in a determined affinity of the user for that product, which would make it more likely that the product will be displayed again to the user based on personalized sorting activities). Furthermore, while not illustrated in FIG. 2D, the recency of user activities may be considered when determining user affinities and their associated weights, such as to give greater weight to more recent activities—if so, details about the recency information is determined may further be configured in at least some such embodiments.

Moreover, in at least some embodiments, the user activity information may include user actions that occur after information about determined personalized category-based sorted products is displayed to the user—such user actions may in at least some embodiments be used as feedback related to how the determination of personalized category-based sorted products for the user was performed, such as to change weights associated with particular determined affinities for the user in the future, and/or to change the determined affinities that are used. For example, if the example user of FIG. 2B repeatedly selected products from the displayed list of books in another sub-category other than Romance and Mystery, the weights for those sub-categories may be decreased and/or a new determined affinity for the other sub-category may be identified. Similarly, if the example user of FIG. 2B repeatedly selected products from the displayed lists of books in one of the two sub-categories of Romance and Mystery but not from the other sub-category, the associated weights for those two sub-categories may be adjusted accordingly, to give greater relative weight to the sub-category that the example user repeatedly selects. In addition, if the example user repeatedly selected products that had relatively low rank (e.g., after scrolling to subsequent groups of sorted products) rather than selecting highly ranked products, the weights associated with some or all of the determined affinities that were used may be reduced accordingly. More generally, in some embodiments, automated techniques for modifying weights may be used in at least some embodiments to modify one or more of the following example types of information: weights associated with particular user-specific personalized determined affinities 260; weights associated with particular non-personalized selection strategies 271; influence of particular selection controls 225; influence of particular factor types 220; etc. For example, with respect to personalized determined affinities 260 for the example user of FIG. 2B, NB testing or other multivariate testing may be used for that user to vary the weights used over time for particular determined affinities 260 when selecting personalized category-based sorted products for that user, in order to determine the results of the different weights with respect to one or more evaluation metrics (e.g., total sales to the user, product selections by the user, etc.). Similarly, with respect to non-personalized selection strategies 271 used for multiple users, A/B testing or other multivariate testing may be used with various users to vary the weights used over time for particular selection strategies 271 when selecting personalized products for those users, in order to determine the results of the different weights with respect to one or more evaluation metrics (e.g., total sales to the users, product selections by the users, etc.). More generally, various types of machine learning techniques may be used to automatically determine weights given to particular user affinities and/or to other information associated with determining personalized category-based sorted products (e.g., particular selection strategies, particular selection controls, etc.), as discussed in greater detail below.

Additional details are included below related to determining user-specific affinities and using determined affinities in ranking products.

FIG. 2E continues the examples of FIGS. 2B-2D, and includes example information 280 related to activities of a user that may be tracked and analyzed corresponding to interactions with entities other than the retailer client. As previously noted, such information 280 may be used in addition to, or instead of, the type of activity information 230 illustrated with respect to FIG. 2C. Accordingly, the information illustrated in FIG. 2D may be modified based on such user activity information 280 of FIG. 2E, such as to modify the determined user affinity information 260 based on an analysis of such additional user activity information 280. In this example, the user activity information 280 includes rows 281-289 that each reflects an interaction of the example user with a particular product in conjunction with one or more online sites other than a site of the example retailer. Various types of columns or fields 291-299 may be tracked and used, including fields 292-296 that are similar to some of those of 242-250 of FIG. 2C, and interaction date information 291 similar to that of column 241 of FIG. 2C. In this example, the activity type information 297-299 includes other types of activities that differ from those of activity types 257-259 of FIG. 2C, although it will be appreciated that information 230 and/or 280 may include some or all of the various activity types 257-259 and 297-299.

In the illustrated example, the activity type information 297-299 corresponds to activities that users may take with respect to one or more social media sites, such as Twitter, Facebook, blogging sites, product review and comparison sites, other opinion sites, etc. In this example, the illustrated examples of activity types include actions that the user takes to like 297 a particular product, to share 298 a particular product with other users (e.g., friends), to mention 299 a product in a posting or other information generated by or supplied by the user (e.g., a list or other collection of items of interest to the user), etc. It will be appreciated that a variety of other types of user activities related to social media or other online sites may be tracked and used. Thus, in this example, the fact that the example user of FIG. 2B has liked books of the Romance and Mystery sub-categories (as shown in rows 281, 282, 285 and 289), has shared information about books of the Romance sub-category (as shown in entry 289) and has mentioned books of the Romance sub-category (as shown in entry 284), such as in a blog post or based on a listing or edition of the particular product to items that the user likes or has of interest to the user, may be used as part of the determination in information 260 of FIG. 2D that this user has a determined affinity for books in the Romance sub-category and Mystery sub-category, as shown in entries 261 and 262 of the information 260, as well as their associated weights. It will be appreciated that a variety of other similar types of information may be tracked and used about users, and used by the PCBPS service as part of determining user affinities for products and product-related attributes.

It will be appreciated that various of the details illustrated in FIGS. 2A-2E are included for explanatory purposes, and that the inventive described techniques may be used in other manners and without the exemplary details.

As noted above, a variety of types of activities by a user may be used to determine an affinity of the user for a particular product. For example, such activities may include interacting with a retailer via one or more sales channels to indicate interest of the user in a product that the user has not yet purchased—such sales channels may include, for example, one or more of a Web site for an online store of the retailer, a physical brick-and-mortar store of the retailer, a mobile application for the retailer that executes on a client device of the user, etc. Non-limiting examples of such user interactions with the retailer may include one or more of the following: viewing online information about the product from the retailer, such as a detail page, reviews, comparisons, etc.; viewing or interacting with the product in a physical brick-and-mortar store of the retailer; searching for the product via an online store of the retailer; adding the product to a wish list or gift registry of the user; adding the product to a list or other collection of items of interest to the user; providing user-supplied content related to the product, such as textual comments, images, videos, etc.; indicating a like or other indication of positive interest in the product; sharing information about the product with one or more other users; etc. While the determined affinities discussed herein generally refer to positive affinities in which a user has a positive interest in a particular product, it will be appreciated that negative affinities may similarly in at least some embodiments be determined and used in which a user has a negative interest in (e.g., a dislike of) a particular product, whether instead of or in addition to positive affinities.

The activities by a user that may reflect an affinity of the user for a particular product may also include interactions with one or more online sites or other entities that are not provided by the retailer, whether instead of or in addition to activities by the user in interacting with the retailer. For example, such activities may include interactions with one or more social media sites, product review or comparison sites, manufacturer or distributor sites, etc., if information about the interactions is publicly available or is otherwise accessible to the PCBPS service (e.g., based on a privileged relationship between the PCBPS service and the other online site or other entity, based on permission provided by the user to access confidential information available to the user, etc.). Non-limiting examples of such user interactions with the non-retailer sites and/or entities may include one or more of the following: viewing online information about the product, such as reviews, comparisons, etc.; searching for the product; adding the product to a wish list or gift registry of the user; adding the product to a list or other collection of items of interest to the user; providing user-supplied content related to the product, such as textual comments (e.g., tweets, blog posts, social networking site wall updates, etc.), images, videos, etc.; indicating a like or other indication of positive interest in the product; sharing information about the product with one or more other users; etc.

With respect to particular product attributes shared by multiple products for which a user may have a determined affinity, such product attributes may be of various types in various embodiments, and may further vary based on the categor(ies) to which the products belong. Non-exclusive examples of such product attributes may include one or more of the following: sub-categories within a category (e.g., corresponding to styles, functions, genres, classes, groupings, etc.); product brands; product manufacturers; product sizes; product materials; product features; product formats; recency of product availability (e.g., for new releases, such as products released within the last month or other configured period of time; for classic products that have been available for at least a configured amount of time or that were first made available during a configured period of time; etc.); popularity of products (e.g., top sellers, such as based on monetary value of units sold and/or number of units sold during the last month or other configured period of time; highly rated, such as based on reviews or other feedback from purchasers and/or other entities during the last month or other configured period of time; most viewed and/or selected over the last month or other configured period of time; highest click-through rate for corresponding online displays over the last month or other configured period of time; etc.); price (e.g., bargain products, such as with prices that have been discounted or are otherwise lower by a specified amount or percentage from at least some other comparative products; premium products, such as with quality and/or prices that are higher by some amount or percentage from at least some other comparative products; etc.); etc. It will be appreciated that, in at least some embodiments, any aspect of a product that may be identified and tracked may be used as such a product attribute.

In addition, with respect to activities by a user that may reflect an affinity of the user for particular product attributes shared by multiple products, such activities may be similar to those activities used to identify an affinity of a user for a particular product. For example, if a user views and/or searches for and/or selects multiple products having a common product attribute, the pattern or other commonalties in the user's activities may be used to automatically determine an affinity of the user for products with that product attribute. Furthermore, such types of user activities may be used to determine user affinities for a product attribute even if they are not used to determine a user affinity for a particular product—for example, if a user purchases multiple products of a particular brand, a determined user affinity for that brand may be identified and used to rank other products from that brand highly, while affinities of the user for the individual products purchased may not be identified and used in at least some embodiments (e.g., to avoid highly ranking the same products that the user has already purchased, unless the products are replenishable or otherwise of a type for which the user may desire multiple copies). In addition to such automated determination of affinities for a user based on identifying patterns or commonalities in prior activities, additional related information may be identified and used based on user-supplied information in at least some embodiments and situations. For example, a particular product attribute may be identified as being relevant for a user based on the user indicating a positive preference for that product attribute, or based on the user indicating a negative preference for one or more other product attributes (e.g., if there is a limited enumerated set of possible product attributes). Additional details are included below related to identifying particular product-related affinities for a user.

The product categories that are used in a particular embodiment may have various degrees of specificity and be determined in various manners in various embodiments. In some embodiments, the product categories may include, for example, some or all of "consumer electronics", "music", "games", "movies", "books", "toys", "sports", "tools", "home", "garden", "grocery", "health", "beauty", "clothing", "shoes", "jewelry", "automotive", "appliances", "baby", etc. Alternatively, a higher-level category such as "entertainment" may be used that includes some or all sub-categories such as "books", "music", "games" and "movies", or a higher-level category such as "consumer electronics" may be separated into multiple lower-level categories such as "cell phones", "computers", "cameras", "TVs", etc. Conversely, a particular product category may instead be separated into multiple lower-level categories, such as to separate the "clothing" category into categories such as "dresses", "coats", "pants", etc. It will be appreciated that various other categories may be used, including in some embodiments to have different categories for different target sites.

As previously noted, the PCBPS service may interact with one or more target sites of various types. The target sites may have various forms in various embodiments, such as from the following non-exclusive list: online retailer Web sites (e.g., which may each provide numerous Web pages that are each specific to one or more particular items, such as to enable consumer users to purchase those items from the site); other non-retailer Web sites that include information about particular items (e.g., review or opinion sites, encyclopedia or other general knowledge sites, search engines that include item information in search results, etc.); other Web sites that include information that is not specific to particular items (e.g., general news sites); and other electronic sites that are accessible in manners other than via the Internet (e.g., an application store or other electronic marketplace that is provided by a cellular telephone network provider and is accessible by devices connected to the cellular network; an electronic store or other marketplace that is provided to users of a specialized type of computing device, such as game consoles connected to a manufacturer-provided electronic store; etc.). In addition, while information about determined personalized category-based sorted products may in some embodiments be provided to a user via an electronic communication that includes an HTML-based Web page, in other embodiments other types of electronic communications may be used to provide such information to a user, such as an HTML-based email electronic communication, an electronic communication that includes a page of information that is not based on HTML (e.g., a Web page specified using another markup language or data format, an email specified using another format, a Multimedia Messaging Service message or similar communication, a multimedia-based chat or instant message communication, etc.).

The personalized category-based product sorting techniques of the PCBPS service may in some embodiments operate in conjunction with other techniques for selecting advertisements or other content items for display, such as recommendation strategies that are used to evaluate the relevance of particular product/service items to recommend to particular users in particular situations. For example, such recommendation strategies may in some embodiments be based at least in part on prior actions by a user (e.g., the user's browsing history, particular interactions of the user with particular target sites and/or content items and/or product/service items, etc.), and may be used to provide recommendations by the PCBPS to a user, whether in addition to or instead of determined personalized category-based sorted products. A non-exclusive list of types of actions of customers of online or other retailers with items for which interaction data is gathered and used for such recommendations may include, for example, the following: performing searches (e.g., for particular items, for items of a particular category or other defined group of items, for items having one or more indicated attributes, etc.); browsing item categories; following hyperlinks related to items and otherwise viewing detailed information about particular items; purchasing items; doing item returns; etc.

The interaction data about the prior user actions with items may be analyzed and summarized in various ways for use with such recommendation strategies, such as, for example, in the following non-exclusive manners: to identify items that are popular (e.g., the top item sellers in a particular category or from a particular retailer during a particular period of time; the items that are most often selected by users, such as to view detailed information about the items; the items with the highest user ratings; the items most often included in results of users' searches and/or selected by users from such search results; the "hottest" items of an item group to reflect those items having the largest changes in their ratings or sales or other popularity measure during a particular period of time; etc.); to identify items that are similar to each other (e.g., items that have similar or otherwise related items attributes, such as price, type, size, etc.) or are otherwise related to each other (e.g., users who viewed this item are most likely to also view these other items; users who viewed this item are most likely to purchase these items; users who purchased this item are most likely to also purchase these other items; users who searched for this item attribute and/or browsed this item category are most likely to view and/or purchase these items or items with these attributes or items in these categories; etc.); to identify items that are popular among users similar to a user for whom targeted recommendations are being made (e.g., users with similar demographics; users in the same or nearby geographic regions, etc.); to identify items that have been explicitly associated with one another, such as by a retailer, an advertiser, a manufacturer, and/or another user (e.g., "buy together" items); to identify items that are similar or otherwise related to items interacted with by a particular user, such as a user to whom targeted recommendations are to be provided (e.g., interactions related to items purchased by the user, items viewed by the user, items added to a shopping cart of the user, etc.); etc. Some or all of the various types of analyzed or summarized user interaction data may then each be used for selection of content items to recommend to users. At least some such information may similarly be used with non-personalized selection strategies, as discussed in greater detail elsewhere herein.

In addition, multiple non-personalized selection strategies may be used together in various ways in various embodiments, as previously noted, and multiple recommendation strategies may similarly be used together in various ways in various embodiments. For example, in some embodiments and situations, results from multiple available strategies may be gathered for a particular situation involving a particular user, and then those various results may be aggregated in various manners. As one example of aggregating various results from multiple strategies, the various results may be weighted or otherwise ranked, so as to determine relevance scores or other relevance levels for those results, and then some or all of those various results may be selected to be used for that user based on those weightings or other rankings. The weighting or other ranking of various results may be performed in various manners, such as based on a weighting or ranking provided by a particular strategy that identified the item (e.g., with a top sellers strategy weighting the highest item seller as the top item for that strategy, and progressively weighting lower seller items as lower items), based on inclusion of a particular item in the results from multiple different strategies, etc. In other embodiments, relevance scores or other levels may be determined for particular items in manners other than based on weighting or other ranking. In addition, in other embodiments, a particular one of multiple available strategies may instead be selected for use in a particular situation, such as based on a dynamic determination that the particular strategy is optimal or otherwise preferred for the particular situation, or instead based on a prior selection or configuration to use that particular strategy in that particular situation (e.g., based on prior configuration by a human operator, based on a prior automated selection of that particular strategy, etc.). A dynamic determination to use a particular strategy at a given time based on a current situation may be based on, for example, a comparison of the results from that particular strategy to results from one or more other possible strategies, a failure or other inability of other possible strategies to provide useful results or any results, etc. Additional details related to example embodiments of using various strategies are included in co-pending U.S. patent application Ser. No. 13/584,611, entitled "Multi-Strategy Generation of Product Recommendations" and filed Aug. 13, 2012, which is hereby incorporated by reference in its entirety.

As noted above, the determination of personalized affinities for a user and the determination of personalized category-based sorted products for the user based at least in part on such determined affinities may be performed in various manners in various embodiments. Particular example details for performing such activities in at least one embodiment are shown below, but it will be appreciated that the described techniques are not limited to such details.

In some embodiments, the determination of personalized category-based sorted products for a user is performed to assess the products that are most relevant for the user, such as the products that the user is most likely to be interested in. For example, given a Query q, with query terms $t_i$, the terms may be weighted using a Bayesian model, resulting in the following calculation:

$$P(c_j | t_1, t_2, \ldots, t_i) \propto P(c_j) \prod_i P(t_i | c_j)$$

As examples of possible query term weighting, consider the following. Suppose that the total product catalog for a target size has 100 products, with categories having product quantities as follows:

|Brand:Gucci|=21
|Brand:Fendi|=24
|PriceTier_Luxury|=55

Given such products and categories, consider a query for Brand:Gucci, Brand:Fendi, PriceTier:Luxury, resulting in the following:

P(Brand:Gucci|q)=P(Brand:Gucci)*P(Brand:Gucci|Brand:Gucci)=0.21

Thus, using the Laplace Correction, we obtain:

PRWeight::Brand:Gucci=0.21
PRWeight::Brand:Fendi=0.24
PRWeight::PriceTier_Luxury=0.55

After such term weights are determined, they may be used for weighting the relevance scores of various products for a particular user.

In addition, when analyzing prior user activity information, user actions to be considered may include at least user views, user clicks and user purchases, with some embodiments further consider user actions in adding products to a cart, in-store purchases at brick-and-mortar stores, search terms used, etc. Affinities may be determined for particular products and for product attributes that include at least categories and sub-categories, brands, new arrivals, with some embodiments further using product attributes such as price or price tier, geo-location, size, color, inventory level, etc. Examples of possible activity-related information for determining affinities of a user include using the following influence for various example types of user activities, with values being provided on a scale of, for example, 1-5, and with such values being configurable by target site clients in at least some embodiments:

User view/click of product in a Category—2.3
User purchase of product in a Category—1.5
User view/click of product in a Brand—2.3
User purchase of product in a Brand—3.4 (thus weight a purchase 50% more than a view)
User view/click of particular product—3.8
User purchase of particular product—0.0 (thus do not give any weight to purchase of a product)
Any user action for new products—5.0 (thus weight an affinity for product newness the highest in this example)

When considering the recency of user actions, the following influence may be used in some embodiments, with such values being configurable by target site clients in at least some embodiments:

| Time | Weight |
| --- | --- |
| today | 100% |
| yesterday | 99% |
| 2 days ago | 98% |
| more than 2 days ago | 97% |

When considering possible selection controls to vary the amount of diversity and/or personalization, the following influence may be used in some embodiments, with such values being configurable by target site clients in at least some embodiments:

| Input | Weight (0-1) | Description |
| --- | --- | --- |
| Diversity | 0.25 | Controls how much variety of brand or category/sub-category is incorporated into the results, by penalizing duplicate occurrences. |
| Personalization | 0.25 | Controls the percentage of results that come from personalized results list versus from non-personalized selection strategies. |

For example, consider the following personalization-related example using a weight of 0.3:
Non-Personalized ranked results: g1, g2, g3, g4, g5, g6, g7, g8, g9, g10
Personalized results: p1, p2, p3, p4, p5
Final integrated results with p=0.30: p1, g1, p2, p3, g2, g3, g4, g5, g6, g7

In some embodiments, personalization may be further controlled using individualized personalization values for one or more of the percentage of particular products from the personalized results, the percentage of products in a particular brand from the personalized results, and the percentage of products in a particular sub-category from the personalized results.

Other possible controls for determining the personalized category-based sorted products for a particular user may include one or more of the following, with such values being configurable by target site clients in at least some embodiments:

| Input | Value | Description |
| --- | --- | --- |
| result count | 120 | Number of default results to provide |
| # of days product considered new | 14 | Number of days since release |
| user newness affinity % for views | 55 | Percent of user's views that are for new products to quality as having an affinity for new products |
| user newness affinity % for purchases | 55 | Percent of user's purchases that are for new products to quality as having an affinity for new products |
| lookback number of days | 90 | Number of days of user's history to use for personalization |

When considering non-personalized selection strategies, some embodiments may use one or more of the following:

| Input | Description | Weight |
| --- | --- | --- |
| topranked_clicks | # of clicks for the past X days | 1.00 |
| topranked_views | # of views for the past X days | 1.00 |
| topranked_ctr | click-through rates (clicks/views) for the past X days | 1.00 |
| topranked_releasedate | recency of publish date for the past X days | 1.00 |
| topranked_salecount | units sold for the past X days | 1.00 |
| topranked_totalcents | total sales $ in the past X days | 1.00 |

Some embodiments may further use one or more of the following, with weights of, for example, 1.00:

topranked_hot_items—for assessing other ranking types during specified short time frame (e.g., today)

topranked_social—top ranked most tweeted, liked, shared, blogged products topranked_fashionitas—top ranked products for people listed as "fashionistas"

topranked_urban—top ranked products for people in defined urban areas topranked_weather_rainy—rank ordering of top items sold in rainy weather After an initial weighted ranking is performed, some embodiments may further sort the ranked list by one or more product-related metadata, such as sales channel or sale type, and with a lower value in this example resulting in a higher final ranking (e.g., with sale items appearing higher than clearance in this example):

topranked_sale_items—products with marked with 'sale' flag—3000 topranked_clearance_items—products with marked with 'clearance' flag—9000 topranked_channel—products sold online vs. in-store—1.00

Additional examples of possible techniques for determining personalized weights include the following:

Weights are a function of the recency of historical user activity events and their frequency of occurrence per field Weights are a count of frequency of occurrence+number of historical user activity events for fields Additional examples of possible techniques for determining personalized category-based sorted products include the following:

Use the Spearman's Footrule Distance, F (a list distance function) to, given multiple rankings of products based on different criteria, provide a unified ranking of products that combines all the rankings in a way that minimizes some cost function on the distance from the final ranked list with respect to all of the input ranked lists. In particular, given ranked lists c1 and c2 (such as, for example, TopSellers and ReleaseDateRecency), and a product $p_i$, use the following formula:

$$F(c1, c2) = \sum_{i=1}^{n} |c1.\text{rank}(p\_i) - c2.\text{rank}(p\_i)|$$

Use the Kendall Tau Distance (a list distance function) to, given multiple rankings of products based on different criteria, provide a unified ranking of products that combines all the rankings in a way that minimizes some cost function on the distance from the final ranked list with respect to all of the input ranked lists. In particular, given ranked lists c1 and c2 (such as, for example, TopSellers and ReleaseDateRecency), look at all pairs and add up ordering differences Use median rank to allow weighting of lists, combined with average rank as tiebreaker:

a*averageRank+b*medianRank

Weighted Rank Aggregation (WRA) may be used be, given personalized weights from user activities, determine client-specific customizable personalized category-based sorted products. For example, a rank-ordered lists of products may be determined, with one list per ranking vector, using the following formula:

$$\text{Rank}(p) = \text{RankPosition}_p\left(\forall\, pi\left[\text{Median}_{pi}\left(\bigcup_{j=1}^{|C|} \bigcup_{k=1}^{Cj.weight*100} Cj.\text{getRank}(pi)\right)\right]\right)$$

In particular, given multiple sorted (ranked) lists of products, rank aggregation may be used to combine those lists into one single ranked list taking the ordering of all the input lists into account, while minimizing the discrepancy of the final result list with respect to the input lists.

An example simple rank aggregation algorithm may be used as follows, with the final rank of a product being the result of a*averageRank+b*medianRank using the ranks of the product in each ranked input list. Suppose we have product $P_j$ which is the #1 result of the PR list, and #15 in the top sellers list and #3 in the top viewed list. Assuming a=0.01 and b=1.0, the final rank will then be 3.0633, as the result of 0.01*average(1, 3, 15)+1.0*median{1, 3, 15}. Furthermore, weighting of input lists may be allowed using multiset median. Thus, in the preceding example, suppose we want to weight PR=0.25; top sellers=0.5; and top views=0.25. Using multiset median, each list may be replicated to the right proportion (in this example by replicating top sellers at twice the amount of the other lists), so we have: {1, 3, 15, 15}. Assuming a=0.01 and b=1.0, the final rank will then be 9.085, as the result of 0.01*average(1, 3, 15, 15)+1.0*median{1, 3, 15, 15}.

As a further example, consider the following personalized determined affinities for a particular user.
C1=Category:ReleaseDateRecency=0.25
C2=Category:TopSellers=0.25
C3=UserPersonalizedPR=0.50, with quantity-related weights as follows:
  PRWeight::Brand:Gucci=0.21
  PRWeight::Brand:Fendi=0.24
  PRWeight::PriceTier_Luxury=0.55
Further suppose we have 2 candidate products P1, P2, P3 with ranks

|    | C1 | C2 | C3 |
|----|----|----|----|
| P1 | 3  | 8  | 12 |
| P2 | 4  | 6  | 16 |
| P3 | 9  | 15 | 25 | assuming a=0.01 and b=1.0,
Final Rank(P1)=0.01*average(3, 8, 12, 12)+1.0*Median(3, 8, 12, 12)=10.0875
Final Rank(P2)=0.01*average(4, 6, 12, 12)+1.0*Median(4, 6, 12, 12)=9.085
Final Rank(P3)=0.01*average(9, 15, 25, 25)+1.0*Median(9, 15, 25, 25)=20.185
Thus, the output would be the sorted products in the order: P2, P1, P3.

As previously noted, diversity controls may be used in some embodiments, such as to provide a diversity-aware penalty factor so that, if a result repeats information (categories, brands, etc.) of higher ranked results, it gets penalized. For example, the following techniques may be used.

Normalized: to a 0 . . . 1 range for ease of comparison
  Discount: Top-ranked results get higher weight than lower results
  Cumulative Gain: add up the scores of all the top k items
  Iterative algorithm to get diverse results
  1) Get top k highest ranked relevant results
  2) for (p=1 . . . k) {
    for each remaining unselected result r_h {calculate its gain based on how similar it is to prior selected results if above result is the best so far, save r_h as the p^th result}}

In some embodiments, markov chain models may be used for non-personalized ranking. For example, ranked lists may be represented with nodes and edges (with edges being transition probabilities of choosing another product). As one model, it may choose uniformly from the multiset of all candidates that were ranked higher than or equal to P by some voter that ranked P. As another model, it may choose uniformly a candidate Q from all candidates and switch if the majority preferred Q to P.

In some embodiments, machine learning techniques may be used to determine weights for queries. As previously noted, such machine learning techniques may in some embodiments be based on use of A/B testing or other multivariate testing for a single user or for multiple users, such as to vary the weights and/or factors used over time when selecting personalized category-based sorted products for the user(s), in order to determine the results of the different weights and/or factors with respect to one or more evaluation metrics (e.g., total sales to the user(s), product selections by the user(s), etc.). Such automated testing may use various types of techniques to determined modified weights and/or other factors, including, for example, gradient descent with respect to the one or more evaluation metrics.

As previously noted, various types of information may be tracked any analyzed for users, including data from different sources. Additional details related to gathering and analyzing user-related data and other types of data are included in co-pending U.S. patent application Ser. No. 13/830,491, entitled "Integration Of Multi-Channel Customer Data" and filed Mar. 14, 2013, which is hereby incorporated by reference in its entirety.

Figure 3:
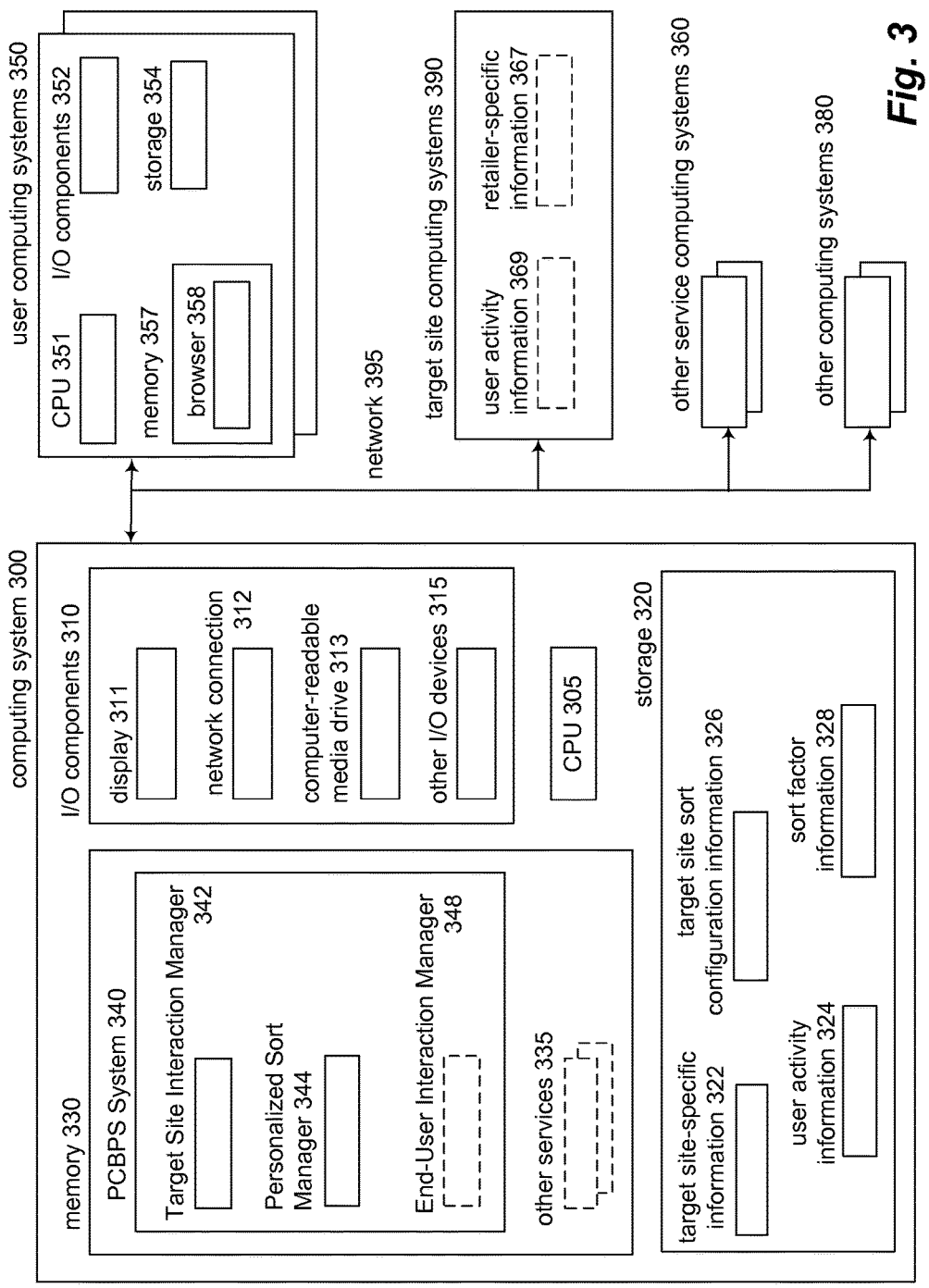
FIG. 3 is a block diagram illustrating example computing systems suitable for executing a personalized category-based product sort system for determining a sorted order of products in an indicated category in a manner that is personalized to a user.

FIG. 3 is a block diagram illustrating example computing systems suitable for executing a personalized category-based product sort system for determining a sorted order of products in an indicated category in a manner that is personalized to a user. In particular, FIG. 3 illustrates a server computing system 300 suitable for executing an embodiment of a Personalized Category-Based Product Sort ("PCBPS") system 340, as well as various user computing systems or devices 350, target site computing systems 390, other optional computing systems 360 that optionally provide other online services that users may interact with, and other optional computing systems 380. In the illustrated embodiment, the server computing system 300 has hardware components that include one or more CPU processors 305, various I/O components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 have components similar to those of server computing system 300, including a CPU 351, I/O components 352 (although particular components are not illustrated), storage 354, and memory 357. The other computing systems 360, 380 and 390 may also each include similar components to some or all of the components illustrated with respect to computing systems 300 and 350, but such components are not illustrated in this example for the sake of brevity.

An embodiment of the PCBPS system 340 is executing in memory 330, such as under control of CPU processor(s) 305 as programmed or otherwise configured by executable software instructions of the system 340, and the system 340 may interact with computing systems 350, 360, 380 and/or 390 over the network 395 (e.g., via the Internet and/or the World Wide Web, via a private cellular network, etc.). In this example embodiment, the PCBPS system 340 includes functionality related to determining sorted orders of products in indicated categories in a manner that is personalized to users (not shown) who are interacting with user computing systems 350, such as in conjunction with a PCBPS service provided by or otherwise managed by the PCBPS system 340. The information from the PCBPS system may in some embodiments and situations be provided directly to the user computing systems 350, while in other embodiments the information may be provided indirectly by the PCBPS system via one or more target sites provided by the computing systems 390 to the users and/or via other services (e.g., optional other services 335, optional other services provided by the other service computing systems 360 and/or by the other computing systems 380, etc.) that interact directly with the users, such as if the users are customers of the services.

The other computing systems 350, 360, 380 and 390 may have various forms, and may be executing various software as part of interactions with the PCBPS system. For example, a user computing system 350 may include various types of client devices (e.g., a desktop computing system, a laptop or tablet or other portable computing system, a smartphone or other cell phone or other mobile device that includes appropriate communication and computing capabilities, etc.), and in the illustrated embodiment is shown executing a Web browser 358 or other software in memory 357 to interact with other computing systems (e.g., the target site computing systems) and/or the PCBPS system 340 (e.g., if the software 358 is a module of the PCBPS system that is designed to execute on a client device). The Web browser 358 or other software on a user computing system 350 may, for example, obtain and display Web pages or other information from target site computing systems 390, such as on one or more display devices that are part of the I/O components 352. In addition, the display of that information may initiate one or more requests by the Web browser 358 to the PCBPS system 340 to obtain information about personalized category-based sorted products determined by a Personalized Sort Manager module 344 of the system 340, such as may be triggered by corresponding instructions or information included in the obtained Web pages or other information being displayed. The Web browser 358 or other software on the user computing system may display or otherwise present some or all of the information obtained in response to those requests (e.g., as part of a Web page from a target site, via a GUI of the PCBPS system that is displayed to the user on the user computing system 350, etc.) to enable the user to interact with or otherwise use that information in various manners (e.g., to obtain additional information about associated product/service items, to initiate purchases or other acquisitions of such associated product/service items, etc.).

While not illustrated, software executing on one or more of the target site computing systems 390 may similarly interact with the PCBPS system 340 (e.g., with a Target Site Interaction Manager module 342 of the system 340) to provide configuration information about how to perform the determination of personalized category-based sorted products for one or more users of the target site, such as permanently or instead on a temporary basis (e.g., to allow the target site to dynamically change one or more selection strategies that are used and/or their associated weights to reflect current conditions of the target site), and/or may obtain information about personalized category-based sorted products selected by the Personalized Sort Manager module 344 of the system 340 for particular users in order to include some or all of that obtained information as part of Web pages provided to those users for display, whether instead of or in addition to interactions by the user computing systems 350 with the PCBPS system 340 (e.g., with an optional End User Interaction Manager module 348 of the PCBPS system 340).

In addition, the PCBPS system 340 may in some embodiments be integrated with or otherwise affiliated with one or more other services (e.g., online retailers or other retailers, item review services, databases or other services that provide information about items and/or about user actions with items, etc.), and if so may interact with those other services in various manners. If so, one or more such other services may, for example, execute on computing system 300 as other services 335 in memory 330, as one or more other services (not shown) that each execute on one or more of the target site computing systems 390, and/or as one or more services (not shown) that each execute on one or more of the other remote service computing systems 360. The interactions with the other services may include, for example, some or all of the following non-exclusive list: obtaining information about user activities performed via user interactions with Web pages of target sites or by the users otherwise interacting with the target sites, such as corresponding to optional user activity information 369 on target site computing system 390; obtaining information about products and other items to which the service has access and associated information (e.g., category information, product-related attributes, etc.), such as target site-specific information 367 on target site computing system 390 and/or similar product information (not shown) on other service computing system 360, to include in the target site-specific information 322 in storage 320; obtaining information about various other types of prior interactions of customers and other users with the other services, such as related to products (e.g., to view information about items; to purchase items; to provide other types of feedback about particular items or relationships between items, such as that a particular item is regarded in a particular positive or negative manner, or that two or more items are similar to each other or are otherwise related in one or more manners; to provide information via social media about a positive or negative preference of a user for a product or for products having particular product-related attributes; etc.); etc. The PCBPS system may obtain such information in various manners, such as by the PCBPS system pulling such information from one or more other services periodically and/or on demand, by one or more other services pushing such information to the PCBPS system periodically and/or as otherwise triggered (e.g., as soon as the information is available, such as to maintain a live feed so that the PCBPS system has access to the most up-to-date available information), etc.

After such information is obtained by the PCBPS system, the PCBPS system may then store such information for later use. For example, the target site-specific information may be stored in database data structure 322 on storage 320. The information about various types of prior activities of customers or other users may be stored in database data structure 324 on storage 320. The PCBPS system may alternatively store some or all such information or on one or more remote other computing systems 380, or in other embodiments may instead retrieve the information as needed and not maintain a local copy of the information. Various other information related to the operation of the PCBPS system 340 may also be stored in storage 320 or elsewhere, including information generated by or for the PCBPS system (e.g., configuration information 326 specified by retailers or other target sites for use with their users; other information about clients of the PCBPS system, such as payment-related information for clients that are charged fees by the PCBPS system, as well as other types account information; information about particular end users who receive information about personalized category-based sorted products determined by the PCBPS system, including determined user affinity information and related information in the sort factor information 328; information about particular client devices of end users that display personalized category-based sorted products determined by the PCBPS system, such as information that relates to capabilities to display or otherwise present personalized category-based sorted products determined; etc.).

The PCBPS system 340 may use the various available information in various manners, including to determine personalized category-based sorted products for particular users and particular categories in particular situations. For example, the Personalized Sort Manager system 344 may determine personalized category-based sorted products for a particular user when the user requests category-specific information from a particular retailer client or other target site client. In some embodiments, the determined personalized category-based sorted products are displayed on the same electronic information page (e.g., Web page) as other information from the retailer or other target site client, with such other information optionally being related to or associated with additional products or services distinct from those provided in the determined personalized category-based sorted products. The PCBPS system 340 may determine the personalized category-based sorted products for a user and indicated category in various manners, as discussed in greater detail elsewhere. The personalized category-based sorted product information provided by the PCBPS system 340 may in some embodiments and situations be dynamically generated by the PCBPS system 340 in response to a request, while in other embodiments and situations may be dynamically retrieved by the PCBPS system 340 from previously determined and stored information.

While not illustrated here, the PCBPS system 340 may further have other modules or associated functionality in other embodiments, such as to generate some or all of the user activity information 324 (e.g., based on monitoring users' interactions with target sites or other services; based on retrieving and processing information from retailers or other services related to such interactions, such as to identify data to be used with particular personalized category-based product sort selection strategies; etc.), to have a separate module to analyze user activity information and determine associated user affinities, etc. Additional details related to various operations of embodiments of the PCBPS system and an associated PCBPS service are included elsewhere.

It will be appreciated that computing systems 300, 350, 360 and 380 and 390 are merely illustrative and are not intended to limit the scope of the present invention. For example, computing system 300 may be connected to other devices that are not illustrated, including through one or more networks, such as the Internet or via private networks (e.g., mobile communication networks, etc.), or via the World Wide Web. More generally, a "client" or "server" computing device or other computing system may comprise any combination of hardware that may interact and perform the described types of functionality, such as when programmed or otherwise configured with appropriate software, including, without limitation, desktop or laptop or tablet or slate computers or other computers, smart phone computing devices and other cell phones, Internet appliances, PDAs and other electronic organizers, database servers, network storage devices and other network devices, wireless phones, pagers, television-based systems (e.g., using set-top boxes and/or personal/digital video recorders and/or game consoles and/or media servers), and various other consumer products that include appropriate communication capabilities. For example, the illustrated system 340 and/or its modules may include executable software instructions and/or data structures in at least some embodiments, which when loaded on and/or executed by particular computing systems or devices may be used to program or otherwise configure those systems or devices, such as to configure processors of those systems or devices. Alternatively, in other embodiments, some or all of the software modules and/or systems may execute in memory on another device and communicate with the illustrated computing system/device via inter-computer communication. In addition, while various items are illustrated as being stored in memory or on storage at various times (e.g., while being used), these items or portions of them can be transferred between memory and storage and/or between storage devices (e.g., at different locations) for purposes of memory management and/or data integrity. In addition, the functionality provided by the illustrated PCBPS system 340 may in some embodiments be distributed in additional modules or combined in fewer modules. Similarly, in some embodiments some of the functionality of the PCBPS system 340 may not be provided and/or other additional functionality may be available.

Thus, in at least some embodiments, the illustrated modules and/or systems are software-based modules/systems including software instructions that, when executed by the CPU(s) 305 or other hardware processor(s), program the processor(s) to automatically perform the described operations for that module/system. Furthermore, in some embodiments, some or all of the systems and/or modules may be implemented or provided in other manners, such as at least partially or wholly in designed and configured firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions contents or structured data contents) on a non-transitory computer-readable storage medium, such as a hard disk or flash drive or other non-volatile storage device, volatile or non-volatile memory (e.g., RAM), a network storage device, or a portable media article (e.g., a DVD disk, a CD disk, an optical disk, a flash memory device, etc.) to be read by an appropriate drive or via an appropriate connection. The systems, modules and data structures may also be transmitted as generated data signals (e.g., by being encoded as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
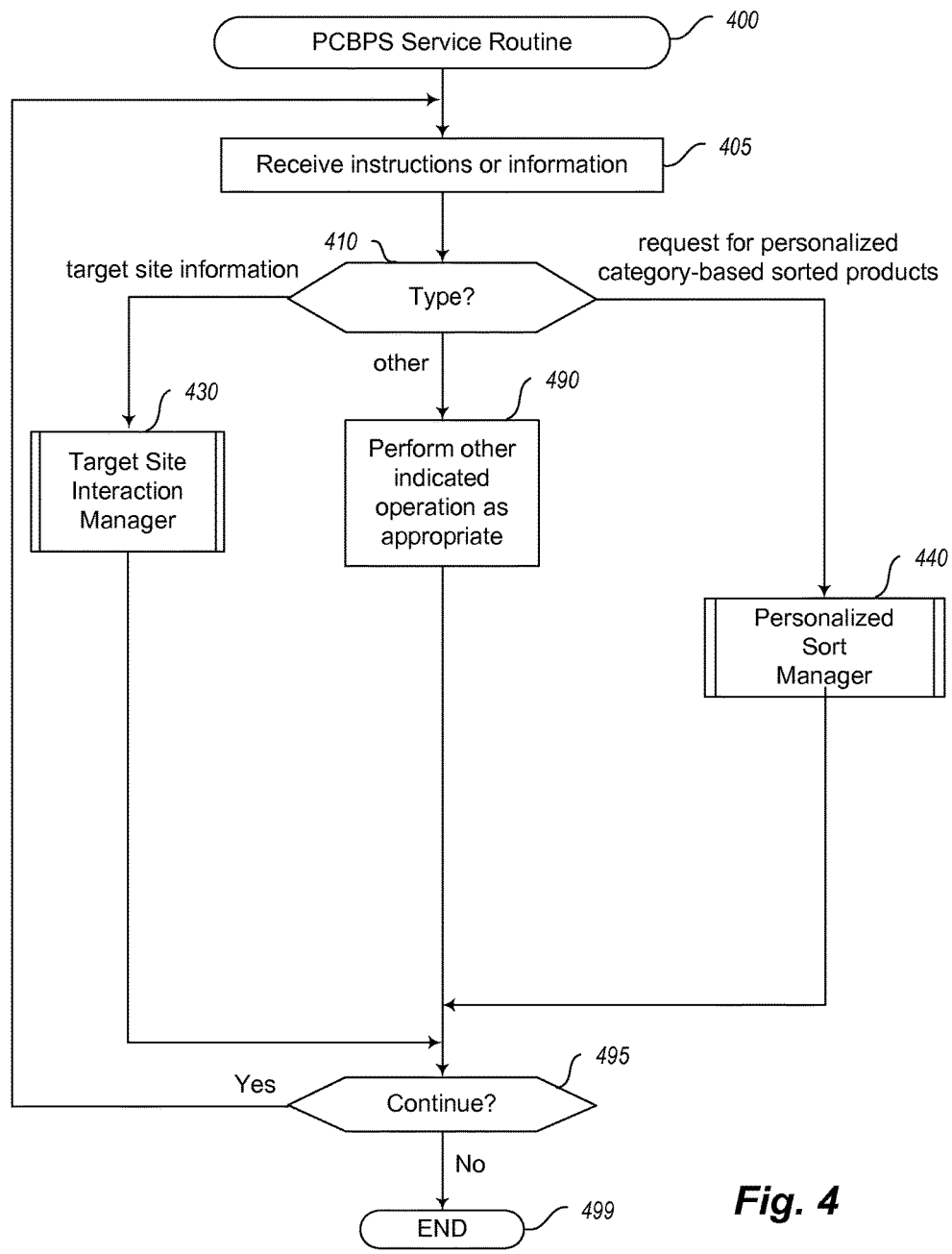
FIG. 4 is a flow diagram of an example embodiment of a Personalized Category-Based Product Sort Service routine.

FIG. 4 is a flow diagram of an example embodiment of a Personalized Category-Based Product Sort Service routine 400. The routine may be provided by, for example, execution of an embodiment of the personalized category-based product sort service 105 of FIG. 1 and/or of the personalized category-based product sort service provided by the personalized category-based product sort system 340 of FIG. 3, such as to provide functionality related to determining and providing information about a personalized sort order for products in an indicated category and an indicated user. The illustrated operations are performed in an automated manner by one or more programmed computing systems in the illustrated embodiment.

The illustrated embodiment of the routine 400 begins at block 405, where instructions or information is received. The routine then continues to block 410 to determine the type of information or instructions, and to proceed accordingly. In particular, if it is determined in block 410 that the information or instructions received in block 405 are from a target site, such as with respect to determining personalized category-based product sort information to include on Web pages or other information pages supplied by that target site, the routine continues to block 430 to execute an embodiment of a Target Site Interaction Manager routine, with one example of such a routine being further illustrated with respect to FIG. 5. If it is instead determined in block 410 that the information or instructions received in block 405 are a request to provide information about personalized category-based product sort information for a particular user, such as from a target site for the particular user in conjunction with a particular Web page or other information page supplied by that target site, or such as from the particular user, the routine continues to block 440 to execute an embodiment of a Personalized Sort Manager routine, with one example of such a routine being further illustrated with respect to FIG. 6.

If it is instead determined in block 410 that the information or instructions received in block 405 are not from a target site and are not a request for determined personalized category-based sorted product information, the routine continues instead to block 490 to perform one or more other indicated operations as appropriate. Such other operations may have various forms in various embodiments, with a non-exclusive list of such operations including the following: receiving information about prior user activities with one or more target sites or other sites, and storing the information for later use in determining personalized category-based sorted products; analyzing received information about prior user activities to determine product-related affinities and associated weightings for particular users; receiving information about capabilities of a client device of a particular user, and storing the information for later use in providing information about personalized category-based sorted products for that user, and storing the information for later use; etc.

After blocks 430, 440 or 490, the routine continues to block 495 to determine whether to continue, such as to continue until an explicit instruction to terminate is received (e.g., from an administrative user of the PCBPS service). If it is determined to continue, the routine returns to block 405, and otherwise continues to block 499 and ends.

Figure 5:
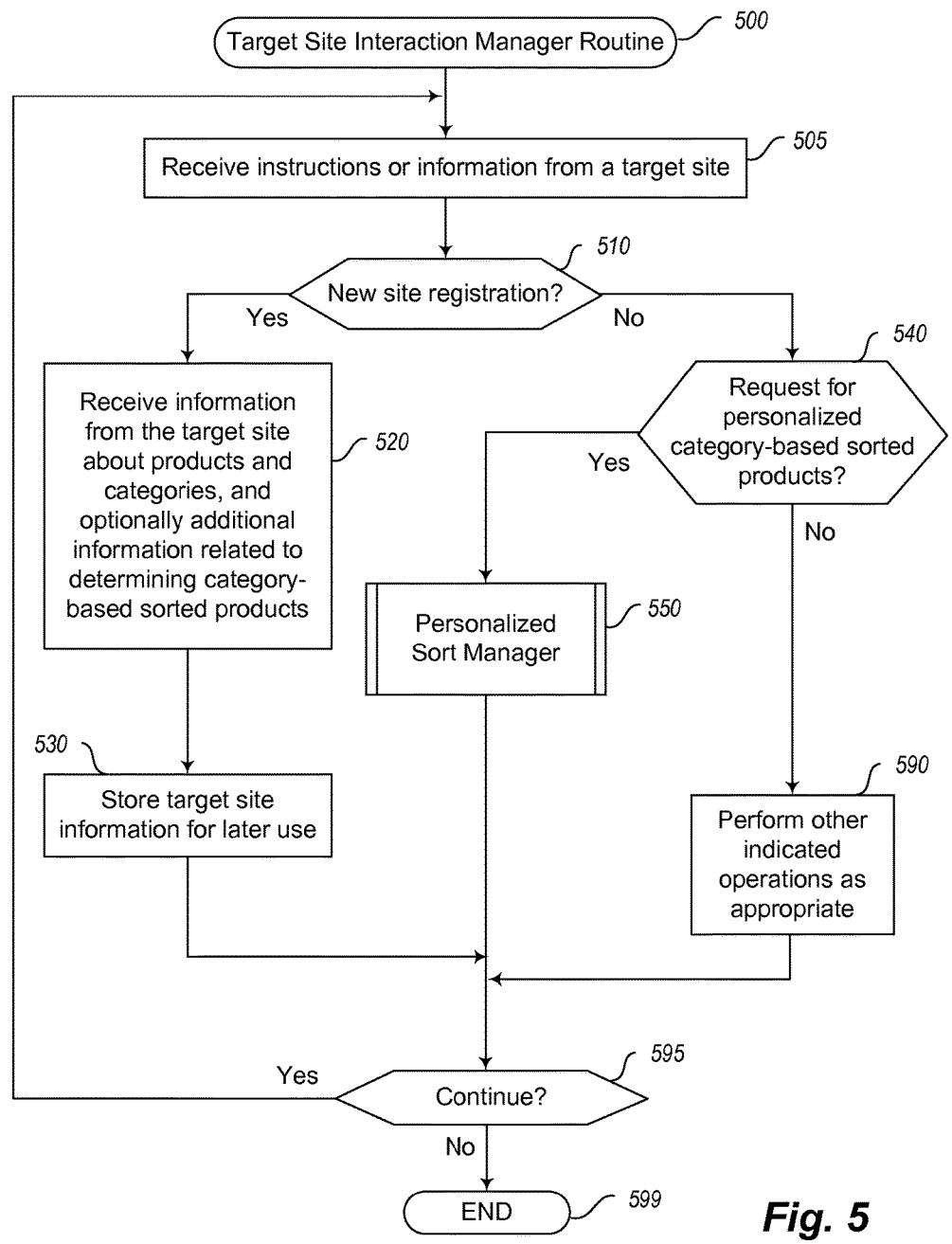
FIG. 5 is a flow diagram of an example embodiment of a Target Site Interaction Manager routine.

FIG. 5 is a flow diagram of an example embodiment of a Target Site Interaction Manager routine 500. The routine may be provided by, for example, execution of an embodiment of the Target Site Interaction Manager module 342 of the PCBPS system 340 of FIG. 3 and/or of a portion of the personalized category-based product sort service 105 of FIG. 1, such as to facilitate the use of information about determined personalized category-based sorted products with particular Web pages and/or other information pages of particular target sites. The routine may be invoked in various manners in various embodiments, including with respect to block 430 of FIG. 4. The illustrated operations are performed in an automated manner by one or more programmed computing systems in the illustrated embodiment.

The illustrated embodiment of the routine 500 begins at block 505, where instructions or information is received for a target site, such as from a user representative of the target site, or from software executing on the target site. The routine then continues to block 510 to determine if the instructions or information correspond to a registration of a new target site for which personalized category-based sorted products may be determined and displayed. If so, the routine continues to block 520 to receive information about the target site, and in block 530 stores the target site information for later use in determining personalized category-based sorted products to display. It will be appreciated that obtaining the information about a target site may include a variety of types of interactions over time, and the receipt of a variety of types of information. As discussed in greater detail elsewhere, the target site-related information may include information about particular Web pages and/or other information pages provided by the target site to end users (e.g., category-specific information pages), information about product items and/or other items that are the subject of at least some of the Web pages (including various metadata about particular product items, including associated product categories), information about one or more portions of information pages that are available for display of personalized category-based sorted products (such as a blank area of the page, an area designated to hold information for one or more category-based products, etc.), information about prior activities of particular users with the target site, information about a contractual arrangement via which the personalized category-based product sort service will provide information about determined personalized category-based sorted products for the target site (e.g., in exchange for defined fees paid by the target site and/or paid to the target site by the personalized category-based product sort service, including in some cases to obtain payment and/or payment information in advance from the target site), etc. In addition, as discussed in greater detail elsewhere, the interactions with the target site may occur in various manners in various embodiments, including based on interactions of a user representative of the target site with a GUI provided by the PCBPS service, or instead in other manners.

If it is instead determined in block 510 that the information or instructions received in block 505 are not related to registering a new target site, the routine continues instead to block 540 to determine if a request is received from a target site for information about one or more determined personalized category-based sorted products for a particular user, such as on behalf of that user who will receive one or more Web pages or other information pages from the target site. If so, the routine continues to block 550 to execute an embodiment of a Personalized Sort Manager routine, with one example of such a routine being further illustrated with respect to FIG. 6.

If it is instead determined in block 540 that the information or instructions received in block 505 are not a request for information about one or more determined personalized category-based sorted products, the routine continues instead to block 590 to perform one or more other indicated operations as appropriate. Such other operations may have various forms in various embodiments, with a non-exclusive list of such operations including the following: receiving and responding to instructions from a target site to modify a previous registration, including to optionally suspend or terminate the relationship between the target site and the personalized category-based product sort service; receiving and responding to a request from a target site regarding the performance of interactions between the target site and the personalized category-based product sort service, such as to enable monitoring by the target site of ongoing determination and provision of personalized category-based sorted products for the target site; receiving and responding to a request from a target site regarding modification of configuration information used for the personalized category-based product sort service for the target site, whether on a temporary or permanent basis; receiving and storing information about prior or current interactions of a particular user with the target site and any other related user actions; etc.

After blocks 530, 550 or 590, the routine continues to block 595 to determine whether to continue, such as to continue until an explicit instruction to terminate is received. If it is determined to continue, the routine returns to block 505, and otherwise continues to block 599 and ends. In addition, as part of block 595, the routine may further provide a return indication to a routine from which it was invoked (e.g., routine 400 of FIG. 4).

Figure 6:
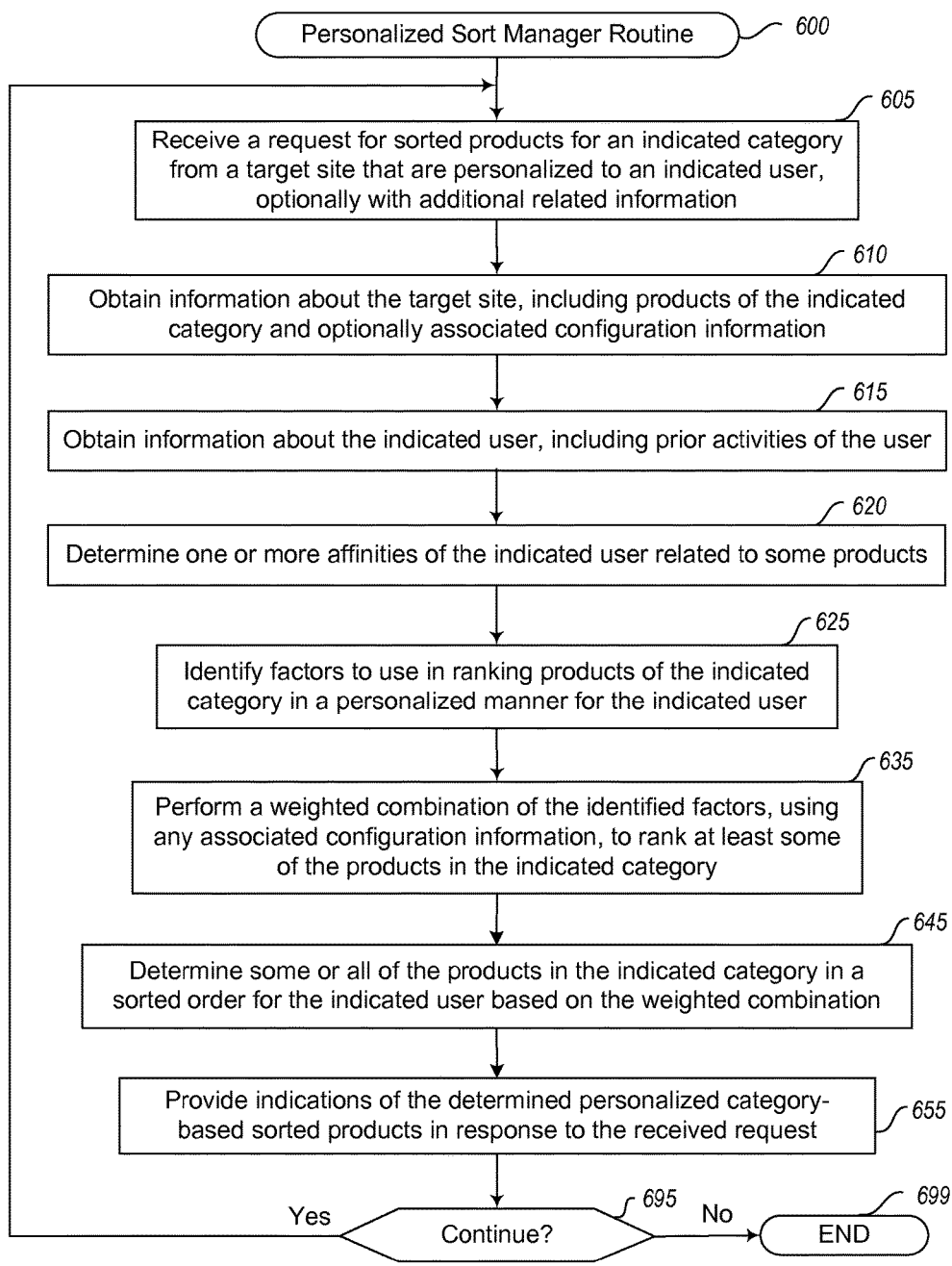
FIG. 6 is a flow diagram of an example embodiment of a Personalized Sort Manager routine.

FIG. 6 is a flow diagram of an example embodiment of a Personalized Sort Manager routine 600. The routine may be provided by, for example, execution of an embodiment of the personalized category-based product sort service 105 of FIG. 1 and/or the Personalized Sort Manager module 344 of FIG. 3, such as to dynamically determine personalized category-based sorted products for a particular user. The illustrated operations are performed in an automated manner by one or more programmed computing systems in the illustrated embodiment. In addition, while various activities are illustrated as occurring together at a particular point in time, it will be appreciated that at least some activities of the routine may be performed at different times, such as to perform activities related to blocks 620-635 (e.g., to determine affinities specific to one or more particular users, and identify related weights and factors to use with those affinities) at a first time, before later receiving requests at a second time to use such previously determined information as part of performing a determined personalized category-based product sort for a particular user, while in other embodiments such activities in blocks 620-635 may be performed dynamically at the time of such a request.

The illustrated embodiment of the routine begins in block 605, where a request is received for information about sorted products for an indicated category from a target site that are personalized to an indicated user, optionally along with additional related information for use in the determination (e.g., configuration information related to how to weight or otherwise determine the personalized products for the user). Such additional information could be, for example, one or more selection strategies to use in a non-personalized manner as part of the determination, a number of products to return from the determination or otherwise an indication of a subset of the various products in the indicated category that are available to be returned, etc. In addition, the request may be received in various manners in various embodiments, such as a programmatic request from an executing program via a defined API of the PCBPS service, if the service provides such an API.

After block 605, the routine continues to block 610 to obtain information about the target site, including products of the indicated category, and optionally associated configuration information for the target site (whether previously specified or received in block 605) to be used in the personalized determination activities for users of the target site. In block 615, the routine then obtains information about the indicated user, including prior activity information for the user. In block 620, one or more affinities of the indicated user are determined with respect to one or more products and/or one or more product-related attributes, based at least in part on the prior activity information of the user obtained in block 615. In block 625, the routine then identifies factors to use in ranking products of the indicated category in a personalized manner for the indicated user, and associated weights to use for the identified factors, such as by selecting one or more of the determined affinities to have a corresponding identified factor to use in the ranking. In some embodiments, all of the applicable determined affinities are selected and used as identified factors. In block 635, the routine then performs a weighted combination using the identified factors, as well as any associated configuration information, to rank some or all of the products in the indicated category in a personalized manner for the indicated user. Additional details related to the activities of blocks 625-635 are included elsewhere herein.

After block 635, the routine continues to block 645 to determine some or all of the products in the indicated category for use in a recommended sorted order for the indicated user that is based on the weighted combination, such as to use all of the products, or an indicated subset. In block 655, the routine then provides information about the determined personalized category-based sorted products in response to the received request. As discussed in greater detail elsewhere, in some embodiments the request received in block 605 is sent from the indicated user's client device based on information in a Web page or other information page supplied to the indicated user from the indicated target site, with the information in block 655 being provided to the user's client device for display in combination with the other information supplied by the target site.

After block 655, the routine continues to block 695 to determine whether to continue, such as to continue until an explicit indication to terminate is received (e.g., from an administrative user of the PCBPS service). If it is determined to continue, the routine returns to block 605, and otherwise continues to block 699 and ends.

Figure 7:
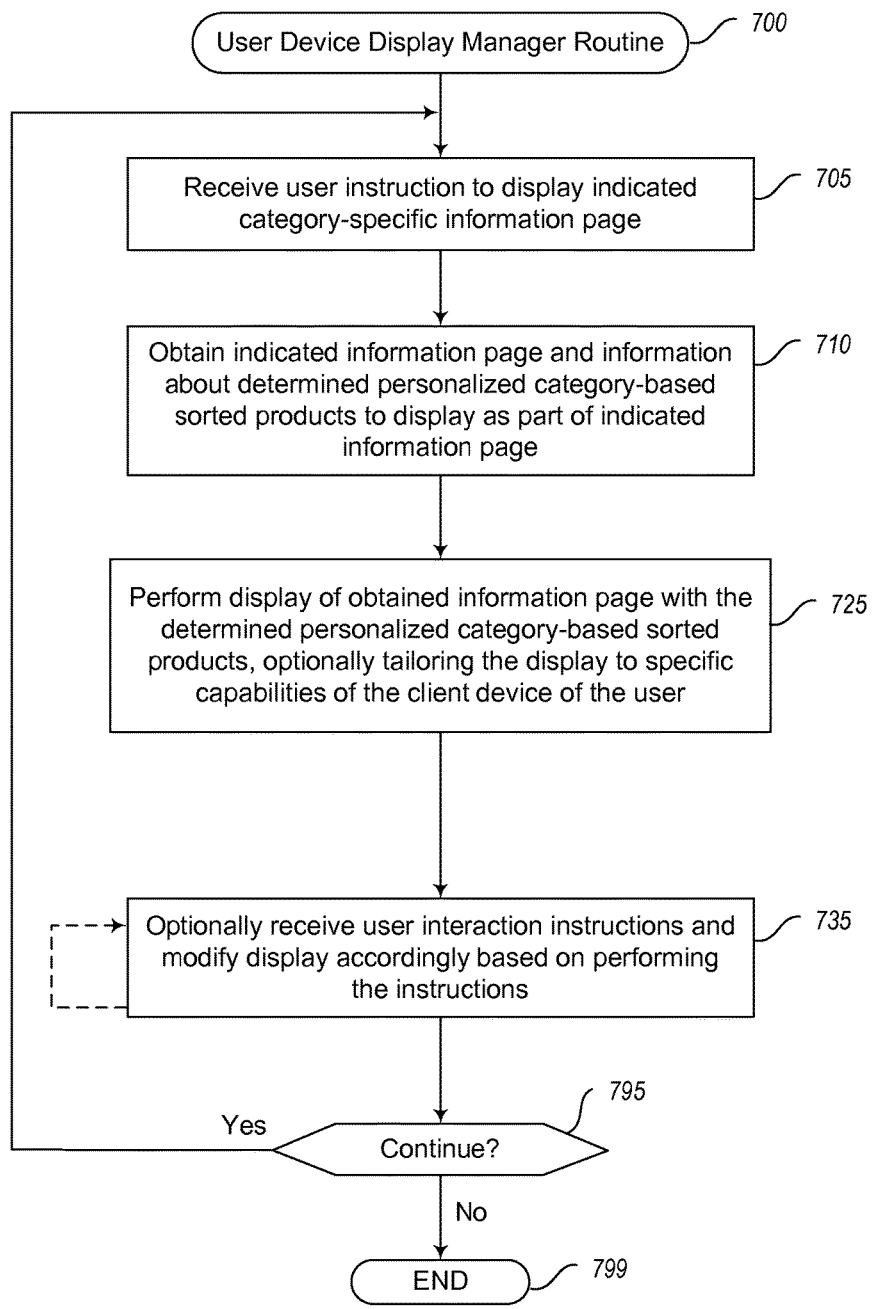
FIG. 7 is a flow diagram of an example embodiment of a User Device Display Manager routine.

FIG. 7 is a flow diagram of an example embodiment of User Device Display Manager routine 700. The routine may be provided by, for example, execution of software (e.g., browser 358) of user computing system 350 of FIG. 3 and/or of software executing on client devices (not shown) of users 140 of FIG. 1, such as to facilitate the display to end users of information about determined personalized category-based sorted products as part of Web pages and/or other information pages of target sites, and to optionally enable additional types of end user interactions with such displayed information.

The illustrated embodiment of the routine 700 begins at block 705, where a user instruction is received to display an indicated information page of a target site. Such an instruction may include, for example, clicking on a link to a target site Web page, opening an HTML-based target site email information page, performing a browse request for an indicated category, entering search terms within a Web page that includes searching capabilities for an indicated category, etc. In other embodiments, the display of a particular target site information page may be initiated in other manners than an explicit user instruction.

In block 710, the routine then performs operations to obtain the indicated information page, such as to request and receive a particular target site Web page by interacting with remote Web site server software for that target site. When interacting with one or more remote computer systems to obtain the indicated information page, the routine may further optionally provide various information about the client device executing the routine and/or about an end user who is using the client device, as discussed in greater detail elsewhere. In addition, the routine in block 710 further performs operations to obtain information about one or more determined personalized category-based sorted products for display as part of the indicated target site information page. The obtaining of the information about the one or more determined personalized category-based sorted products may be performed in various manners, such as by performing interactions with a remote personalized category-based product sort service to request and receive the determined personalized category-based sorted products. For example, as previously discussed, when the client device initiates display of a received configured target site information page, the configured information page may include links (e.g., HTML <img> elements, or similar functionality) that initiate interactions between the client device and the personalized category-based product sort service to obtain information about determined personalized category-based sorted products to display in particular locations of the target site page.

In block 725, the routine then performs the display of the obtained target site information page and obtained determined personalized category-based sorted products information to an end user, and may further in some embodiments and situations tailor the display to use specific capabilities of the client device (or to not use capabilities that are not available on the client device). It will be appreciated that references to displaying an information page and/or information about determined personalized category-based sorted products may include using a variety of types of client device capabilities and/or end user senses in particular situations, including to play audio and/or video, to visually display various types of information, etc. In addition, while the display of the indicated information page and determined personalized category-based sorted products will in many cases occur on the client device, in at least some embodiments and situations, the client device executing the routine will obtain information to be displayed and then initiate some or all of the actual display activities on one or more other devices of the user or devices that are otherwise accessible to the client device. Adapting display of an indicated information page and/or information about determined personalized category-based sorted products may further include various activities in various embodiments, such as to enable a user interface for the displayed information that is based on multi-touch display of the client device, to accommodate display of the information on a display size different than that for which the indicated information page is designed or intended, etc.

After block 725, the routine continues to block 735 to optionally enable the end user to interact with information about particular displayed personalized category-based sorted products, and to perform operations corresponding to such interactions, including to optionally modify the display accordingly. As is indicated by the dashed arrow, a variety of user interactions may in some cases occur without changing the particular information page that is being displayed, including to scroll through a list or other collection of some or all products in an indicated category. Conversely, if the end user selects a link to another information page that is displayed on the indicated information page, or the user otherwise specifies to load another information page, the routine may continue to block 795 and then back to 705 to perform those operations.

Thus, after the end user completes any optional interactions with the displayed indicated information page in block 735, the routine continues to block 795 to determine whether to continue, such as to continue until an explicit instruction to terminate is received. If it is determined to continue, the routine returns to block 705, and otherwise continues to block 799 and ends.

Those skilled in the art will also appreciate that in some embodiments the various described systems and modules may each perform functionality that may be expressed in one or more routines, such as to perform various steps or operations in various manners (e.g., in serial or in parallel, in a synchronous or asynchronous manner, in a particular order, etc.). Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects have been discussed in specific terms such as to be described as processes and/or systems and/or may be presented at times in certain claim forms, the inventors contemplate the various aspects of the invention in any available claim form, including methods, systems, computer-readable mediums on which are stored executable instructions or other contents to cause a method to be performed and/or on which are stored one or more data structures to enable performance of such a method, etc.

What is claimed is:

1. A computer-implemented method comprising:
receiving, by one or more configured computing systems of a personalized category-based product sort service via an API (application programming interface) of the personalized category-based product sort service, a programmatic request for a sorted list of products in an indicated category to provide to an indicated customer of an online retailer as part of a Web page from the online retailer that is specific to the indicated category, wherein the online retailer is a client of the personalized category-based product sort service;
obtaining, by the one or more configured computing systems, information about a product catalog of the online retailer that includes a plurality of products in the indicated category;
obtaining, by the one or more configured computing systems, information about prior activities of the indicated customer while interacting with the online retailer, the prior activities including actions of the indicated customer related to viewing information about products and related to purchasing products;
obtaining, by the one or more configured computing systems, information about one or more selection strategies for use in selecting products in the indicated category that are not personalized to the indicated customer;
identifying, by the one or more configured computing systems, multiple factors for use in determining the sorted list of products and associated weights for the multiple factors, wherein one or more of the identified factors correspond to affinities specific to the indicated customer that are determined from analysis of the obtained information about the prior activities, and wherein one or more other of the identified factors correspond to the one or more selection strategies;
determining, by the one or more configured computing systems, the sorted list of products in a manner that is automatically personalized to the indicated customer based at least in part on the prior activities, the determining being based on a weighted combination of the identified multiple factors using the associated weights;
providing, by the one or more configured computing systems and in response to the received programmatic request, information about the determined sorted list of products to a client device of the indicated customer, to cause display of the sorted list of products to the indicated customer on the client device in a displayed graphical user interface that includes the Web page specific to the indicated category from the online retailer and that includes a displayed selectable representation for each of the products in the sorted list to cause further related functionality to be provided, and to allow the indicated customer to initiate further activities with the online retailer based on interactions with the displayed sorted list of products in the graphical user interface;
obtaining, by the one or more configured computing systems and from the further activities initiated by the indicated customer based on interactions with the displayed sorted list of products in the graphical user interface, additional information about selection by the indicated customer of one or more products in the displayed sorted list of products via the displayed selectable representations of the one or more products;
modifying, by the one or more configured computing systems and based at least in part on the obtained additional information, one or more of the associated weights for one or more of the multiple factors, for use in later sorting of products for the indicated customer; and
performing, by the one or more configured computing systems, the further related functionality for each of the selected one or more products, and transmitting corresponding updated information for display to the indicated customer in the displayed graphical user interface.

2. The method of claim 1 further comprising:
obtaining additional information about additional prior activities of the indicated customer while interacting with one or more social media services distinct from the online retailer;
performing, by the one or more configured computing systems, the analysis of the obtained information about the prior activities and an analysis of the obtained additional information; and
determining, by the one or more configured computing systems, multiple affinities of the indicated customer related to product attributes based on the performed analysis of the obtained information and on the performed analysis of the obtained additional information, and
wherein the identified multiple factors include at least some of the determined multiple affinities of the indicated customer.

3. The method of claim 2 wherein the performing of the analysis of the obtained information and the analysis of the obtained additional information includes determining, by the one or more configured computing systems and for each of the determined multiple affinities, an associated weight for the determined affinity, and wherein the associated weights for the identified multiple factors include the determined associated weight for each of the at least some determined affinities.

4. The method of claim 2 wherein the obtained information about the prior activities of the indicated customer while interacting with the online retailer include first prior activities of the indicated customer in interacting with a Web site of the online retailer and further include second prior activities of the indicated customer in a physical retail store of the online retailer, the prior activities including actions of the indicated customer related to viewing information about products and related to purchasing products.

5. A computer-implemented method comprising:
receiving, by one or more configured computing systems of a personalized sort service, information about an indicated customer of an online retailer and an indicated category of products available from the online retailer;
performing, by the one or more configured computing systems, an analysis of information about prior activities of the indicated customer that include prior interactions with an online store of the online retailer, and determining multiple affinities of the indicated customer related to product attributes based on the analysis;

determining, by the one or more configured computing systems and for the indicated customer, a sorted group of multiple products of the indicated category that are available from the online retailer and that are automatically personalized to the indicated customer, wherein the multiple products are sorted in a manner that is automatically personalized to the indicated customer based at least in part on a weighted combination of factors corresponding to the determined multiple affinities;

transmitting, by the one or more configured computing systems and to a client device of the indicated customer, information about the determined sorted group of multiple products that are automatically personalized to the indicated customer, to cause display of the transmitted information to the indicated customer on the client device of the indicated customer as part of a graphical user interface that includes an information page from the online retailer related to the indicated category and that includes a displayed selectable representation for each of the multiple products in the determined sorted group to cause further related functionality to be provided, and to allow the indicated customer to initiate further activities based on further interactions with the displayed transmitted information in the graphical user interface; and responding, by the one or more configured computing systems, to the further interactions of the indicated customer with the displayed transmitted information in the graphical user interface that includes a selection of one of the multiple products via the displayed selectable representation for the one product, including performing the further activities based on the further interactions, wherein the performing of the further activities includes initiating performing the further related functionality for the selected one product, and transmitting corresponding updated information for display to the indicated customer in the graphical user interface.

6. The method of claim 5 wherein the determining of the multiple affinities of the indicated customer further includes determining, by the one or more configured computing systems, weights for the multiple affinities, and wherein the determining of the sorted group of multiple products includes using at least some of the determined weights for the weighted combination of factors.

7. The method of claim 6 wherein each of the multiple affinities is associated with at least one of the determined weights, and wherein at least one of the determined weights is distinct from at least one other of the determined weights.

8. The method of claim 6 wherein the prior activities of the indicated customer further include additional prior interactions of the indicated customer with one or more social media services distinct from the online retailer, and wherein the determining of the multiple affinities of the indicated customer is further based in part on the additional prior interactions of the indicated customer.

9. The method of claim 8 wherein the determined weights for the multiple affinities are further based at least in part on the additional prior interactions of the indicated customer.

10. The method of claim 8 wherein the additional prior interactions of the indicated customer with the one or more social media services include at least one activity from a group of activities including blogging about products, tweeting about products, and sharing online information about products with other users.

11. The method of claim 6 wherein the online retailer operates at least one online store and at least one physical retail store, wherein the prior activities of the indicated customer further include first interactions of the indicated customer with the at least one online store and include second interactions of the indicated customer with the at least one physical retail store, and wherein the determining of the multiple affinities of the indicated customer is based in part on the first interactions and is based in part on the second interactions.

12. The method of claim 11 wherein the determined weights for the multiple affinities are further based in part on the first interactions and based in part on the second interactions.

13. The method of claim 11 wherein the second interactions of the indicated customer include purchasing products at the at least one physical retail store.

14. The method of claim 6 wherein the prior activities of the indicated customer further include first interactions that occur via a first sales channel of the online retailer and second interactions that occur via a distinct second sales channel of the online retailer, and wherein the determining of the multiple affinities of the indicated customer is based in part on the first interactions and is based in part on the second interactions.

15. The method of claim 14 wherein the determined weights for the multiple affinities are further based in part on the first interactions and based in part on the second interactions.

16. The method of claim 5 wherein the prior interactions of the indicated customer include at least one of a group of activities that include purchasing products at an online store of the online retailer, viewing information about products at the online store, and searching for information about products at the online store.

17. The method of claim 5 wherein the online retailer is one of multiple clients of the personalized sort service, and wherein the determining of the stored group of multiple products is further based at least in part on configuration information specified by the online retailer to the personalized sort service.

18. The method of claim 17 wherein the configuration information is dynamically specified by the online retailer for temporary use and during operation of the personalized sort service via an interface provided by the personalized sort service for use by clients.

19. The method of claim 5 wherein the determined multiple affinities include affinities to one or more of a group including one or more brands, one or more product sub-categories, one or more product sizes, one or more price-related groupings of products, and one or more groups of products based on recency of release date.

20. The method of claim 19 wherein the determined multiple affinities further include affinities of the indicated customer to one or more specific products.

21. The method of claim 5 wherein the determined multiple affinities include affinities to one or more brands, to one or more product sub-categories, and to one or more price-related groupings of products.

22. The method of claim 5 further comprising determining, by the one or more configured computing systems, ranking information for at least some of the multiple products of the indicated category by using one or more selection strategies that are not personalized to the indicated customer, and wherein sorting of the multiple products is further based on a weighted inclusion of the determined ranking information.

23. The method of claim 22 wherein the determining of the ranking information includes using multiple selection strategies that each has a distinct associated weighting.

24. The method of claim 22 wherein the one or more selection strategies are based on at least one of multiple types of product metadata that include information about sales of products, about recency of release of products and about reviews of products.

25. The method of claim 22 wherein the one or more selection strategies include multiple selection strategies, wherein the method further comprises performing multivariate testing with multiple customers of the online retailer to determine weights for the multiple selection strategies based on one or more evaluation metrics, and wherein the sorting of the multiple products based on the weighted inclusion of the determined ranking information includes using the determined weights for the multiple selection strategies.

26. The method of claim 5 further comprising performing multivariate testing during multiple interactions with the indicated customer to determine, for each of the determined multiple affinities, a weight based on one or more evaluation metrics, wherein the factors corresponding to the determined multiple affinities include multiple factors that correspond to at least some of the determined multiple affinities, and wherein the determining of the sorted group of multiple products includes using the determined weight for each of the at least some determined affinities.

27. The method of claim 5 further comprising using machine learning to learn weights associated with one or more of the determined multiple affinities, and wherein sorting of the multiple products based on the weighed combination is further based at least in part on the learned weights.

28. The method of claim 5 further comprising, after the selection by the indicated customer of the one product in the determined sorted group as part of the further interactions of the indicated customer with the displayed transmitted information in the graphical user interface, modifying one or more weights associated with one or more of the determined multiple affinities based at least in part on the selection of the one product.

29. The method of claim 5 wherein the multiple products of the sorted group are a selected subset of a plurality of products of the indicated category that are available from the online retailer, and wherein the determining of the sorted group of multiple products includes determining the selected subset.

30. A non-transitory computer-readable medium having stored contents that cause a computing system to perform a method, the method comprising:
receiving, by the computing system, information about an indicated user of a target site and an indicated category of products for which the target site provides information;
performing, by the computing system, an analysis of information about prior activities of the indicated user that include prior interactions with the target site, and determining multiple affinities of the indicated user related to product attributes based on the analysis;
determining, by the computing system, a sorted group of multiple products of the indicated category that are automatically personalized to the indicated user, wherein the multiple products are sorted in a manner that is automatically personalized to the indicated user based at least in part on the determined multiple affinities;
transmitting, by the computing system, information about the sorted group of multiple products that are automatically personalized to the indicated user, to cause display of the transmitted information to the indicated user in a graphical user interface on a client device of the indicated user that includes a displayed information page from the target site related to the indicated category and that includes a displayed selectable representation for each of the multiple products in the sorted group to cause further related functionality to be provided; and
performing, by the computing system, and based on selection by the indicated user of one of the displayed selected representations for one of the multiple products that is included in the displayed information page in the graphical user interface on the client device of the indicated user, further activities based on the one product.

31. The non-transitory computer-readable medium of claim 30 wherein the target site is an online retailer, wherein the indicated user is a customer of the online retailer, and wherein the information page from the target site is a Web page of an online store operated by the online retailer.

32. The non-transitory computer-readable medium of claim 30 wherein the computing system is part of a personalized product sort service operated by an entity distinct from the target site, wherein the target site is a client of the personalized product sort service, and wherein the method further comprises, after the indicated user initiates further activities based on interactions with the displayed transmitted information in the graphical user interface that include selecting one of the multiple products via the displayed selectable representation of the one product, transmitting, by the computing system, additional information corresponding to the further activities to the client device to cause a corresponding update to the graphical user interface on the client device of the indicated user.

33. The non-transitory computer-readable medium of claim 32 wherein the computer-readable medium is a memory of the computer system, wherein the stored contents are instructions that, when executed, program the computer system to perform the method, and wherein the method further comprises:
performing, by the computing system, sorting of the group of multiple products based at least in part on a weighted combination of factors corresponding to the determined multiple affinities to automatically personalize the sorted group of multiple products for the indicated user;
obtaining additional information about the selecting by the indicated user of the one product in the determined sorted group, and modifying one or more weights associated with one or more of the determined multiple affinities based at least in part on the obtained additional information; and
initiating transmitting updated information for display to the indicated user in the graphical user interface that is based at least in part on the performing of the further related functionality for the selected one product.

34. The non-transitory computer-readable medium of claim 30 wherein the stored contents include a data structure for use in determining the sorted group of multiple products of the indicated category for the indicated user, the data structure comprising multiple entries that each corresponds to one of the determined multiple affinities and includes an indication of a product attribute for the determined affinity of the entry.

35. The non-transitory computer-readable medium of claim 30 wherein the stored contents include a data structure for use in transmitting the information about the sorted group of multiple products, the data structure comprising multiple entries that each corresponds to a spot in a sorted list and includes an indication of one of the multiple products that is in the corresponding spot for the entry.

36. A system, comprising:
one or more processors of one or more computing systems; and
one or more memories storing software instructions that, when executed by at least one of the one or more processors, cause the system to perform personalized sorting of products on behalf of a retailer by:
receiving information about an indicated customer of the retailer and an indicated category of products available from the retailer;
determining a sorted group of multiple products of the indicated category that are available from the retailer, wherein the multiple products are sorted in a manner that is automatically personalized to the indicated customer based at least in part on prior activities of the indicated customer while interacting with the retailer;
providing information about the sorted group of multiple products, to cause display of the sorted group of multiple products to the indicated customer on a client device of the indicated customer as part of a graphical user interface that includes additional information from the retailer related to the indicated category and that includes a displayed selectable representation for each of the multiple products in the sorted group to cause further related functionality to be provided; and
after the indicated customer initiates further activities based on interactions with the displayed provided information in the graphical user interface that include selecting one of the multiple products via the displayed selectable representation of the one product, initiating transmitting updated information for display to the indicated customer in the graphical user interface.

37. The system of claim 36 wherein the one or more memories store further software instructions that cause the system to perform an analysis of information about the prior activities of the indicated customer and to determine multiple affinities of the indicated customer related to product attributes based on the analysis, and wherein the determining of the sorted group of multiple products is based at least in part on the determined multiple affinities.

38. The system of claim 36 wherein the software instructions are part of a personalized product sort service that is operated by an entity distinct from the retailer, and wherein the retailer is a client of the personalized product sort service.

39. The system of claim 36 wherein the retailer is an online retailer that operates an online store, and wherein the additional information from the retailer related to the indicated category is a Web page of the online store that is specific to the indicated category.

* * * * *